United States Patent
Liu et al.

(10) Patent No.: US 12,426,057 B2
(45) Date of Patent: Sep. 23, 2025

(54) INFORMATION TRANSMISSION METHOD AND DEVICE

(71) Applicant: VIVO MOBILE COMMUNICATION CO., LTD., Dongguan (CN)

(72) Inventors: Siqi Liu, Dongguan (CN); Zichao Ji, Dongguan (CN); Xueming Pan, Dongguan (CN); Gen Li, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 427 days.

(21) Appl. No.: 17/966,080

(22) Filed: Oct. 14, 2022

(65) Prior Publication Data

US 2023/0035043 A1 Feb. 2, 2023

Related U.S. Application Data

(63) Continuation of application No. PCT/CN2021/087730, filed on Apr. 16, 2021.

(30) Foreign Application Priority Data

Apr. 16, 2020 (CN) .......................... 202010302290.0

(51) Int. Cl.
  *H04W 72/23* (2023.01)
  *H04W 72/12* (2023.01)
  *H04W 72/1268* (2023.01)

(52) U.S. Cl.
  CPC ....... *H04W 72/23* (2023.01); *H04W 72/1268* (2013.01)

(58) Field of Classification Search
  CPC .......................... H04W 72/23; H04W 72/1268
  See application file for complete search history.

(56) References Cited

U.S. PATENT DOCUMENTS

| | | | |
|---|---|---|---|
| 10,492,184 | B2 | 11/2019 | Papasakellariou |
| 10,523,397 | B2 | 12/2019 | Park et al. |
| 11,032,036 | B2 | 6/2021 | Yang et al. |
| 2017/0026940 | A1 | 1/2017 | Moulsley |
| 2017/0048026 | A1 | 2/2017 | Park et al. |
| 2018/0131598 | A1 | 5/2018 | Suzuki et al. |

(Continued)

FOREIGN PATENT DOCUMENTS

| | | |
|---|---|---|
| CN | 110830178 B | 11/2021 |
| CN | 110999174 B | 5/2022 |

(Continued)

OTHER PUBLICATIONS

CATT, "Remaining details of NR CA operation", 3GPP TSG RAN WG1 Meeting #92, Athens, Greece, Feb. 26-Mar. 2, 2018, R1-1801740.

(Continued)

*Primary Examiner* — Ronald B Abelson
(74) *Attorney, Agent, or Firm* — The Webb Law Firm

(57) ABSTRACT

An information transmission method includes: obtaining first downlink control information DCI, the first DCI carrying count information. The count information includes at least one of the following: count information of joint scheduling DCI, count information of single scheduling DCI, or joint count information of joint scheduling DCI and single scheduling DCI. The first DCI is DCI for scheduling uplink data.

19 Claims, 5 Drawing Sheets

(56) References Cited

U.S. PATENT DOCUMENTS

| | | | |
|---|---|---|---|
| 2018/0332568 A1 | 11/2018 | Wu et al. | |
| 2019/0342035 A1 | 11/2019 | Zhang et al. | |
| 2020/0205084 A1 | 6/2020 | Chen | |
| 2021/0259006 A1 | 8/2021 | Yoshioka et al. | |
| 2023/0164772 A1* | 5/2023 | Cao ..................... | H04W 72/231 |

FOREIGN PATENT DOCUMENTS

| | | |
|---|---|---|
| CN | 110505045 B | 8/2022 |
| EP | 3627750 A1 | 3/2020 |
| JP | 2017539182 A | 12/2017 |
| WO | 2016163464 A1 | 10/2016 |
| WO | 2019033302 A1 | 2/2019 |
| WO | 2020040179 A1 | 2/2020 |

OTHER PUBLICATIONS

NTT Docomo, Inc, "Enchancements on multi-TRP/panel transmission", 3GPP TSG RAN WG1 #96bis, Xi'an, China, Apr. 8-12, 2018, R1-1904966.

Qualcomm Incorporated, "Multi-TRP Enhancements", 3GPP TSG-RAN WG1 Meeting #98bis, Chongqing, China, Oct. 14-20, 2019, R1-1911126.

Hisilicon Huawei, Other issues on NR CA and DC including SRS switching and SUL, 3GPP TSG RAN WG1 Meeting #90bis, Oct. 9-13, 2017, Prague, Czech Republic, R1-1717080.

Hisilicon Huawei, Summary of Enhancements on Multi-TRP/Panel Transmission, 3GPP TSG RAN WG1 Meeting #98, Aug. 26-30, 2019, Prague, Czech Republic, R1-1909602.

NTT Docomo, Inc., Enhancements on multi-TRP/panel transmission, 3GPP TSG RAN WG1 Meeting #97, May 13-17, 2019, Reno, USA, R1-1906224.

* cited by examiner

INFORMATION TRANSMISSION METHOD AND DEVICE

CROSS-REFERENCE TO RELATED APPLICATIONS

This application is a Bypass Continuation Application of PCT/CN2021/087730 filed on Apr. 16, 2021, which claims priority to Chinese Patent Application No. 202010302290.0 filed on Apr. 16, 2020, which are incorporated herein by reference in their entirety.

TECHNICAL FIELD

The present application relates to the field of communication technologies, and in particular, to an information transmission method and device.

BACKGROUND

The 5G NR system supports configuring one or more component carriers (CC) or cells for a terminal. When the terminal is configured to be in a single carrier mode or a self-scheduling mode under carrier aggregation (CA), a plurality of control resource sets (CORESET) and a plurality of search spaces (SS) can be configured for each CC or cell. The network can flexibly configure the number of blind detections for each search space set. According to the configured CORESET and SS, the terminal uses various radio network temporary identifiers (RNTI) to blindly detect a physical downlink control channel (PDCCH) and demodulate downlink control information (DCI), thereby obtaining scheduling information of each cell.

For a case in which one piece of DCI schedules N CCs, once the terminal does not successfully decode or receive the DCI, the terminal may be caused to have an incorrect understanding of the number of pieces of DCI and feedback information, resulting in the generation of wrong feedback information.

SUMMARY

According to a first aspect, embodiments of the present application provide an information transmission method, applied to a user side device, and including:
  obtaining first downlink control information DCI, the first DCI carrying count information, where
  the count information includes at least one of the following: count information of joint scheduling DCI, count information of single scheduling DCI, or joint count information of joint scheduling DCI and single scheduling DCI; and
  the first DCI is DCI for scheduling uplink data.

According to a second aspect, the embodiments of the present application further provide an information transmission method, applied to a network side device, and including:
  sending first downlink control information DCI, the first DCI carrying count information, where
  the count information includes at least one of the following: count information of joint scheduling DCI, count information of single scheduling DCI, or joint count information of joint scheduling DCI and single scheduling DCI; and
  the first DCI is DCI for scheduling uplink data.

According to a third aspect, the embodiments of the present application further provide a user side device, including:
  an obtaining module, configured to obtain first downlink control information DCI, the first DCI carrying count information, where
  the count information includes at least one of the following: count information of joint scheduling DCI, count information of single scheduling DCI, or joint count information of joint scheduling DCI and single scheduling DCI; and
  the first DCI is DCI for scheduling uplink data.

According to a fourth aspect, the embodiments of the present application further provide a network side device, including:
  a sending module, configured to send first downlink control information DCI, the first DCI carrying count information, where
  the count information includes at least one of the following: count information of joint scheduling DCI, count information of single scheduling DCI, or joint count information of joint scheduling DCI and single scheduling DCI; and
  the first DCI is DCI for scheduling uplink data.

According to a fifth aspect, the embodiments of the present application further provide a user side device, including: a memory, a processor, and a computer program stored in the memory and executable on the processor, where when the computer program is executed by the processor, steps of the foregoing information transmission method are implemented.

According to a sixth aspect, the embodiments of the present application further provide a network side device, including: a memory, a processor, and a computer program stored in the memory and executable on the processor, where when the computer program is executed by the processor, steps of the foregoing information transmission method are implemented.

According to a sixth aspect, the embodiments of the present application further provide a non-transitory computer-readable storage medium, storing a computer program, where the computer program is executed by a processor, steps of the foregoing information transmission method are implemented.

BRIEF DESCRIPTION OF THE DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings according to such accompanying drawings.

DETAILED DESCRIPTION

To make the objectives, technical solutions, and advantages of the present application clearer, the present application is described in detail below with reference to the accompanying drawings and specific embodiments.

Terms "first" and "second" in this application are used to distinguish similar objects, and do not need to be used to describe a specific order or sequence. In addition, terms "include", and any variants thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/or" used in this application means at least one of the connected objects. For example, A and/or B represents the following three cases: only A exists, only B exists, or both A and B exist.

When describing the embodiments of the present application, some concepts used in the following description are explained first.

Hybrid automatic repeat request acknowledgement (HARQ-ACK) codebook: HARQ-ACK bit information corresponding to a transport block (TB) is 1 bit, if the bit is 1, it means ACK, and if the bit is 0, it means negative acknowledgement (NACK). If a base station sends a plurality of TBs, and the base station instructs the user to feed back HARQ-ACK information corresponding to the TBs to the base station on a same resource, the user can multiplex, according to a codebook specified in the protocol, the HARQ-ACK bit information of the TBs into new HARQ-ACK information such as a bitmap, and report the information to the base station.

Figure 1:
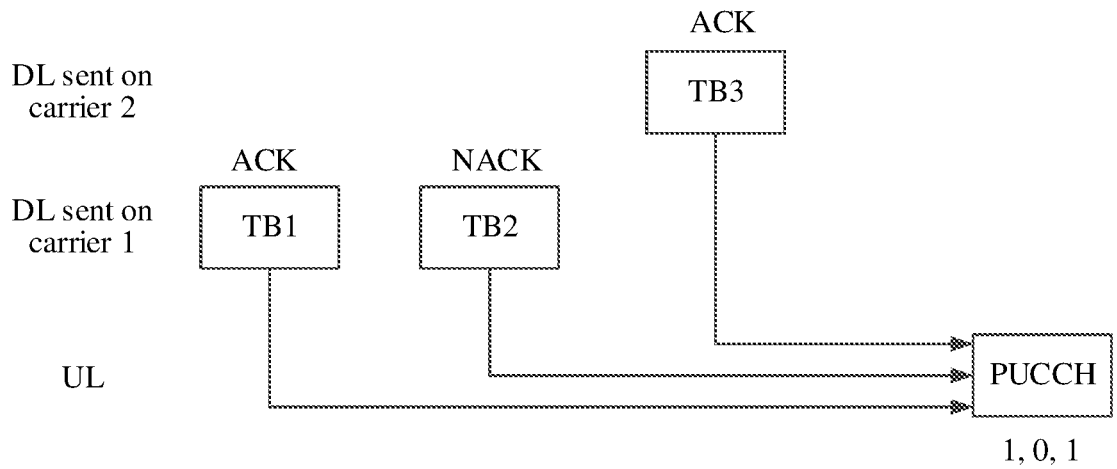
FIG. 1 is a schematic diagram of sending HARQ-ACK information to a base station by a user equipment.

As shown in FIG. 1, using an example in which the base station sends a total of three TBs to the same user on two carriers (carrier 1 and carrier 2), TB1 and TB3 are successfully decoded by the user and TB2 fails to decode, and accordingly, the values of HARQ-ACK bit information corresponding to the three TBs are 1, 0, and 1, indicating ACK, NACK, and ACK. When the base station instructs the user to send out the HARQ-ACK bit information corresponding to the three TBs in the same physical uplink control channel (PUCCH), the user multiplexes the three pieces of HARQ-ACK bit information into a bitmap 101 according to a multiplexing rule defined by the codebook, and sends the bitmap 101 to the base station, and the three bits respectively correspond to feedback information of TB1, TB2, and TB3.

There are two determination manners of the HARQ-ACK codebook, namely semi-static codebook and dynamic codebook. When the HARQ-ACK codebook is in a semi-static determination manner, the size of the HARQ-ACK codebook is relatively fixed. In this case, the size of the HARQ-ACK codebook is determined according to a possible physical downlink shared channel (PDSCH) occasion included in a time window. The size of the time window is calculated according to high-level configuration parameters. In the time window, the number of candidate occasions at which the PDSCH may be received is determined. Therefore, the size of the HARQ-ACK codebook is determined.

When the HARQ-ACK codebook is dynamically determined, the size of the HARQ-ACK codebook may be dynamically changed. In this case, a user equipment (UE) determines a monitoring occasion according to the high-level parameters, and then determines the size of the HARQ-ACK codebook according to the physical downlink control channel (PDCCH) actually received at different monitoring occasions. Because the number of PDCCH actually received in the time window is uncertain, the size of the HARQ-ACK codebook changes dynamically.

Figure 2:
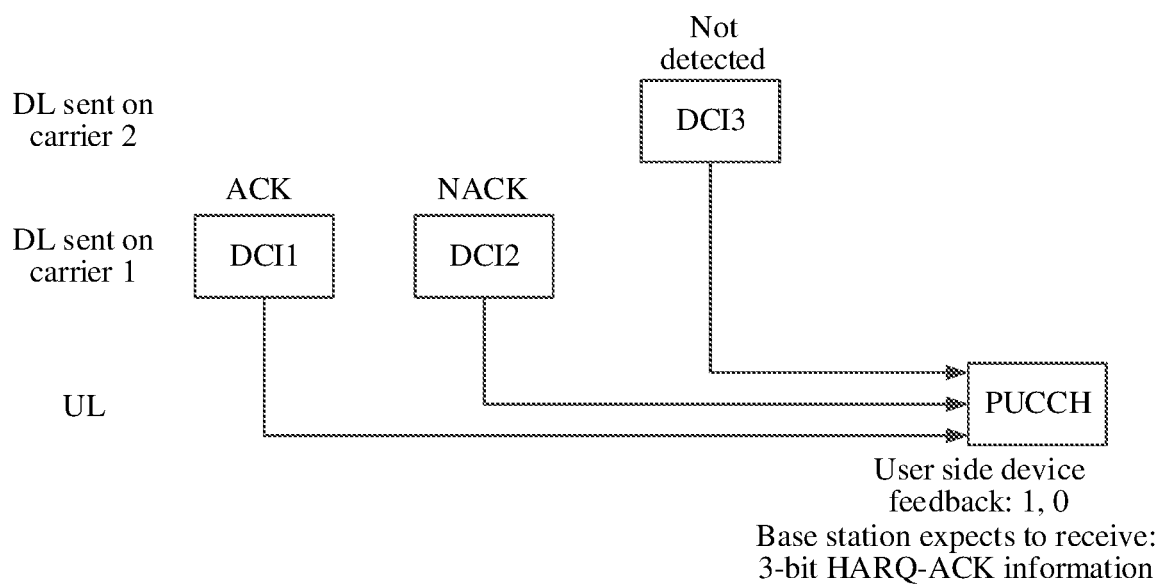
FIG. 2 is a schematic diagram of sending HARQ-ACK information to a base station by a user equipment when partial DCI reception fails.

Downlink assignment index (DAI) in DCI for scheduling a downlink: The UE may lose some downlink DCI, causing that the user and the base station have an inconsistent understanding of the number of sent DCI and the size of the HARQ-ACK information, that is, the UE may incorrectly feed back the HARQ-ACK information. For example, as shown in FIG. 2, if the base station sends DCI1, DCI2, DCI3, and PDSCH and the UE does not detect DCI3 and its PDSCH, the UE only feeds back the HARQ-ACK of the PDSCH of the DCI1 and DCI2 (that is 1, 0), while the base station expects to receive the HARQ-ACK of PDSCH corresponding to the three pieces of DCI (that is, 1, 0, 1) fed back by the UE. Therefore, a DAI field is introduced in the DCI, where a counter DAI (cDAI) is used to notify the UE a counting number of the DCI, and a total DAI (tDAI) is used to indicate how many pieces of DCI are sent up to the current time point (monitoring occasion).

Figures 3, 4:
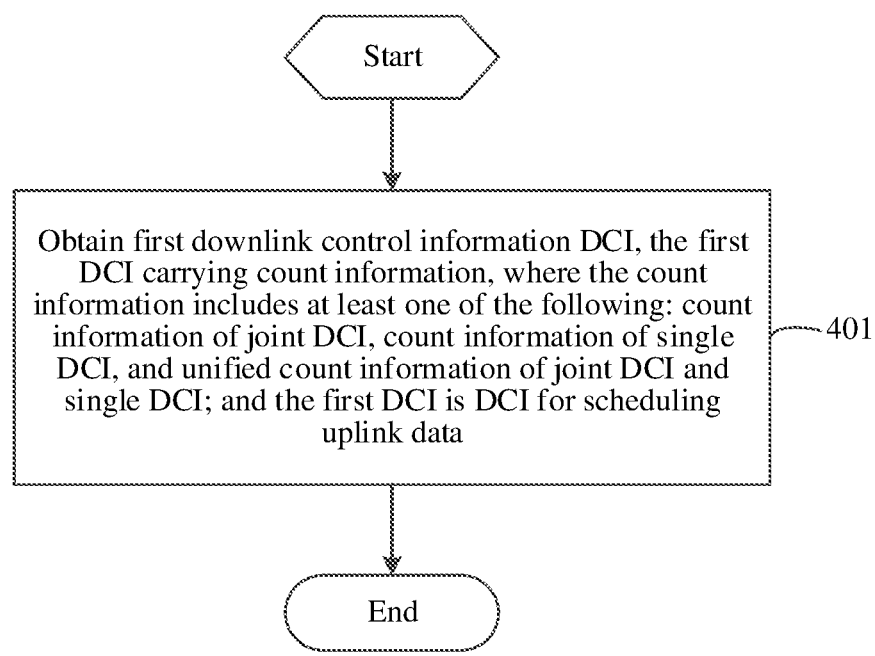
FIG. 3 is a schematic diagram of carrying downlink assignment index (DAI) by DCI.
FIG. 4 is a schematic flowchart 1 of an information transmission method according to an embodiment of the present application.

FIG. 3 is a schematic diagram of eight pieces of DCI carrying a cDAI and a tDAI. There are three monitoring occasions in total, including a monitoring occasion 1, a monitoring occasion 2, and a monitoring occasion 3. The eight pieces of DCI are distributed on four carriers (carriers 1, 2, 3 and 4), and the cDAI and tDAI carried in each piece of DCI are shown in FIG. 3. In this case, if the user loses a certain piece of DCI, the user can determine whether he loses DCI from the tDAI carried in other DCI.

DCI Format:

A counting number of DCI format for scheduling an uplink is 0-x, x is a natural number, and the DCI format is, for example, 0-0, 0-1, or other formats. The DCI format 0-1 for scheduling an uplink also carries a DAI, mainly considering that the user may not receive the last DCI for scheduling a downlink, resulting in an incorrect understanding of the codebook size. In this case, the DCI for scheduling an uplink may indicate a DAI, and based on this value, the user determines how many pieces of DCI are sent by the base station and determines the codebook size.

A counting number of the DCI format for scheduling a downlink is 1-x, x is a natural number, and the counting number is, for example, 1-0 or 1-1.

The present application is aimed at the problem that in the prior art, feedback information of a user side device may be wrong when the DCI reception fails, and provides an information transmission method and device.

As shown in FIG. 4, the embodiments of the present application provide an information transmission method, applied to a user side device, and including: step 401: Obtain first downlink control information DCI, the first DCI carrying count information, where the first DCI is DCI for scheduling uplink data.

A user side device obtains the first DCI sent by a network side device. The first DCI is uplink (UL) DCI, the UL DCI is DCI for scheduling uplink data, and DCI for scheduling downlink data is referred to as downlink (DL) DCI.

The count information includes at least one of the following: count information of joint scheduling DCI, count information of single scheduling DCI, or joint count information of joint scheduling DCI and single scheduling DCI. The user side device performs information feedback according to the count information.

In this embodiment, the joint scheduling DCI is DCI for scheduling a plurality of uplinks or downlinks, and a format corresponding to the joint scheduling DCI for scheduling a plurality of uplinks may be: 0-A1, or a format corresponding to the joint scheduling DCI for scheduling a plurality of downlinks may be 1-A2, where A1 and A2 are positive integers. The single scheduling DCI is DCI for scheduling only one uplink or downlink. The first DCI may be in a single scheduling DCI format, for example, DCI format 0-1, or may be in a joint scheduling DCI format, for example, DCI format 0-A1.

The count information carried in the first DCI may include at least one of the count information of joint scheduling DCI, the count information of single scheduling DCI, or the joint count information of joint scheduling DCI and single scheduling DCI. For example, the count information carried in the first DCI includes the count information of joint scheduling DCI and/or the count information of single scheduling DCI. In this case, the joint scheduling DCI and the single scheduling DCI respectively use different count information fields, that is, the joint scheduling DCI and the single scheduling DCI are counted respectively. Alternatively, the count information carried in the first DCI includes the joint count information of joint scheduling DCI and single scheduling DCI. In this case, the joint scheduling DCI and the single scheduling DCI use a same count information field, that is, the joint scheduling DCI and the single scheduling DCI are jointly counted.

In this embodiment of the present application, the DCI for scheduling uplink data obtained by the user side device can carry at least one of the count information of joint scheduling DCI, the count information of single scheduling DCI, or the joint count information of joint scheduling DCI and single scheduling DCI, to assist the user side device to determine the number or a counting number of the DCI and then determine feedback information. In this way, it can ensure that the user side device and the network side device have the same understanding of the feedback information, and the feedback reliability can be improved.

Optionally, the count information of joint scheduling DCI may be count information of joint scheduling DCI carried in first target DCI; and the first target DCI is latest DCI carrying the count information of joint scheduling DCI before the first DCI.

The count information of joint scheduling DCI may be count information of at least one of DCI for joint uplink scheduling and DCI for joint downlink scheduling. For example, when the count information of joint scheduling DCI is count information of DCI for joint downlink scheduling, the count information corresponding to a total number of joint scheduling DCI is the count information of joint scheduling DCI carried in the first target DCI, or the first target DCI is the latest DL DCI carrying the count information of joint scheduling DCI before the first DCI.

The first target DCI may be DCI that only carries the count information of joint scheduling DCI, that is, the first target DCI only carries the count information of its own type. For example, the first target DCI is joint scheduling DCI, and the joint scheduling DCI carries the count information of joint scheduling DCI. The first target DCI may alternatively be DCI that simultaneously carries the count information of joint scheduling DCI and the count information of single scheduling DCI, that is, the first target DCI simultaneously carries count information of two types. The DCI that simultaneously carries the count information of joint scheduling DCI and the count information of single scheduling DCI may be joint scheduling DCI or single scheduling DCI. For example, the latest DCI carrying the count information of joint scheduling DCI before the first DCI is single scheduling DCI, and the single scheduling DCI carries both the count information of joint scheduling DCI and the count information of single scheduling DCI.

The count information of joint scheduling DCI carried in the first DCI may be determined according to at least one of the format of the first DCI, the type of the first DCI (that is, joint scheduling DCI or single scheduling DCI), or the configuration of the network side device. Optionally, in a case that a first condition is met, the first DCI carries the count information of joint scheduling DCI. In this embodiment, the first condition includes: at least one of the following:

a) that the first DCI is DCI for joint uplink scheduling, that is, when the first DCI is joint UL DCI, the first DCI carries the count information of joint scheduling DCI;

b) that the first DCI is in a first format; for example, the first DCI is joint UL DCI format 0-A1, that is, when the first DCI is in the first format, the first DCI carries the count information of joint scheduling DCI;

c) that second DCI is configured by a network side device to carry count information of joint scheduling DCI; where the second DCI may be the first DCI, optionally, the first DCI may only carry the count information of joint scheduling DCI; and the second DCI may alternatively be at least one of other DCI, such as UL DCI, DL DCI, single scheduling DCI, or joint scheduling DCI;

d) that single scheduling DCI is not configured by a network side device; that is, when there is no single scheduling DCI, the first DCI carries the count information of joint scheduling DCI; or e) that a time domain position of the first DCI is a position in a third set, where the third set is a preset time domain position set, and when the time domain position of the first DCI is a position in the third set, for example, when the time domain position of the first DCI mod time domain position period is 1=X, the count information of joint scheduling DCI carried in the first DCI is the count information of joint scheduling DCI carried in latest DCI carrying the count information of joint scheduling DCI before the first DCI.

In this embodiment, optionally, when at least one of the first conditions is met, the first DCI carries the count information of joint scheduling DCI, and the count information of joint scheduling DCI may be equal to the count information carried in joint DL DCI Format 1-A2 that is latest before the first DCI and carries the count information. Optionally, this embodiment is applicable to the case where the joint scheduling DCI and the single scheduling DCI respectively use different count information fields, that is, the joint scheduling DCI and the single scheduling DCI are counted respectively.

Optionally, if the first DCI is joint UL DCI format 0-A1, the count information carried in the first DCI is count information carried in joint DL DCI format 1-A2 that is latest before the first DCI; and/or, if the first DCI is single UL DCI format 0-1, the count information carried in the first DCI is count information carried in single DL DCI format 1-1 that is latest before the first DCI.

Optionally, in a case that latest DCI before the first DCI is joint scheduling DCI, the first DCI carries at least the count information of joint scheduling DCI. In this embodiment, if the latest DCI before the first DCI is joint scheduling DCI, the first DCI carries at least the count information of joint scheduling DCI. In a case that the first DCI carries the count information of joint scheduling DCI, the first DCI may further carry other count information, such as the count information of single scheduling DCI.

Optionally, when the first DCI is joint UL DCI format, the first DCI carries at least the count information for joint scheduling DCI. For example, the first DCI is DCI format 0-A1, and the count information for joint scheduling DCI is count information of joint scheduling DCI carried in latest DCI (for example, joint DL DCI Format 1-A2) carrying the count information of joint scheduling DCI before the first DCI; alternatively, when the first DCI is DCI format 0-A1, the first DCI carries the count information for joint DL DCI, and a tDAI carried thereby is a tDAI carried in latest DCI (for example, joint DL DCI Format 1-A2) carrying the count information of joint scheduling DCI before the first DCI.

Optionally, the count information of single scheduling DCI may be count information of single scheduling DCI carried in second target DCI; and the second target DCI is latest DCI carrying the count information of single scheduling DCI before the first DCI.

The count information of single scheduling DCI may be count information of at least one of DCI for single uplink scheduling and DCI for single downlink scheduling. For example, when the count information of single scheduling DCI is the count information of DCI for single downlink scheduling, the corresponding count information of a total number of single scheduling DCI is the count information of single scheduling DCI carried in the second target DCI, where the second target DCI is latest DCI carrying the count information of single scheduling DCI before the first DCI.

The second target DCI may be DCI that only carries the count information of single scheduling DCI, that is, the second target DCI only carries the count information for its own type. For example, the second target DCI is single scheduling DCI, and the single scheduling DCI carries the count information of single scheduling DCI. The second target DCI may alternatively be DCI that simultaneously carries the count information of single scheduling DCI and the count information of joint scheduling DCI, that is, the second target DCI simultaneously carries count information of two types. The DCI that simultaneously carries the count information of single scheduling DCI and the count information of joint scheduling DCI may be joint scheduling DCI or single scheduling DCI. For example, the latest DCI carrying the count information of single scheduling DCI before the first DCI is joint scheduling DCI, and the joint scheduling DCI carries both the count information of joint scheduling DCI and the count information of single scheduling DCI.

The count information of single scheduling DCI carried in the first DCI may alternatively be determined according to at least one of the format of the first DCI, the type of the first DCI, or the configuration of the network side device.

Optionally, in a case that a second condition is met, the first DCI carries the count information of single scheduling DCI.

In this embodiment, the second condition includes: at least one of the following:
A) that the first DCI is DCI for single uplink scheduling, that is, when the first DCI is single UL DCI, the first DCI carries the count information of single scheduling DCI;
B) that the first DCI is in a second format; for example, the format of the first DCI is DCI format 0-1, that is, when the first DCI is in the second format, the first DCI carries the count information of single scheduling DCI;
C) that third DCI is configured by a network side device to carry count information of single scheduling DCI; where the third DCI may be the first DCI, optionally, the first DCI may only carry the count information of single scheduling DCI; and the third DCI may alternatively be at least one of other DCI, such as UL DCI, DL DCI, single scheduling DCI, or joint scheduling DCI;
D) that joint scheduling DCI is not configured by a network side device, that is, when there is no joint scheduling DCI, the first DCI carries the count information of single scheduling DCI; or
E) that a time domain position of the first DCI is a position in a fourth set, where the fourth set is a preset time domain position set different from the third set, and when the time domain position of the first DCI is a position in the fourth set, for example, the time domain position of the first DCI mod time domain position period is 2=Y, the count information of single scheduling DCI carried in the first DCI is the count information of single scheduling DCI carried in latest DCI carrying the count information of single scheduling DCI before the first DCI. Mod represents a modulus operation.

In this embodiment, optionally, when at least one of the second conditions is met, the first DCI carries the count information of single scheduling DCI, and the count information of single scheduling DCI is equal to the count information carried in latest single DL DCI (for example, DCI Format 1-1) carrying the count information before the first DCI. Optionally, this embodiment is applicable to the case where the joint scheduling DCI and the single scheduling DCI respectively use different count information fields, that is, the joint scheduling DCI and the single scheduling DCI are counted respectively.

Optionally, in a case that latest DCI before the first DCI is single scheduling DCI, the first DCI carries at least the count information of single scheduling DCI. In this embodiment, if the latest DCI before the first DCI is single scheduling DCI, the first DCI carries at least the count information of single scheduling DCI. In a case that the first DCI carries the count information of single scheduling DCI, the first DCI may further carry other count information, such as the count information of joint scheduling DCI.

Optionally, if the first DCI is in an existing single scheduling DCI format, the first DCI carries at least count information for single scheduling DCI, and accordingly, the count information of single scheduling DCI is count information of single scheduling DCI carried in latest DCI (for example, DCI Format 1-1) carrying the count information of single scheduling DCI before the first DCI; alternatively, when the first DCI is DCI format 0-1 and carries the count information for single DL DCI, a tDAI carried thereby is a tDAI carried in latest DCI (for example, single DL DCI Format 1-1) carrying the count information of single scheduling DCI before the first DCI.

It is to be noted that, the first DCI may carry a plurality of pieces of count information, such as carrying count information respectively corresponding to joint scheduling DCI and single scheduling DCI. In this case, the joint scheduling DCI and the single scheduling DCI respectively use different count information fields, that is, the joint scheduling DCI and the single scheduling DCI are counted respectively.

For example, the first DCI carries two tDAIs respectively corresponding to a total number of joint scheduling DCI and a total number of single DC. The count information corresponding to the total number of joint scheduling DCI is the count information of joint scheduling DCI carried in the latest DCI carrying the count information of joint scheduling DCI before the first DCI, that is, the first target DCI is the latest DCI carrying the count information of joint scheduling DCI before the first DCI; and/or, the count information corresponding to the total number of single scheduling DCI is the count information of single scheduling DCI carried in the latest DCI carrying the count information of single scheduling DCI before the first DCI, that is, the second target DCI is the latest DCI carrying the count information of single scheduling DCI before the first DCI.

Optionally, the joint count information of joint scheduling DCI and single scheduling DCI is joint count information carried in third target DCI; and the third target DCI is latest DCI carrying the joint count information before the first DCI.

In this embodiment, the joint scheduling DCI and the single scheduling DCI use the same count information field, that is, the joint scheduling DCI and the single scheduling DCI are jointly counted. If the joint scheduling DCI and the single scheduling DCI use the same count information field, the count information is the joint count information carried in the latest DCI carrying the joint count information before the first DCI.

Using an example in which the first DCI is in an existing single scheduling DCI format, for example, DCI format 0-1, the count information is joint count information carried in the latest DCI carrying the joint count information before the first DCI; alternatively, using an example in which the first DCI is a joint UL, for example, DCI format 0-A, the count information is the joint count information carried in the latest DCI carrying the joint count information before the first DCI.

Optionally, in a case that a time domain position of the first DCI is a position in a first set, the first DCI carries the joint count information of joint scheduling DCI and single scheduling DCI. The first set may be a preset time domain position set different from at least one of the third set or the fourth set, or optionally, the first set may be a time domain position set including an overlapping part of the third set and the fourth set. When the time domain position of the first DCI is a position in the first set, the first DCI carries the joint count information of joint scheduling DCI and single scheduling DCI, and the joint count information is the joint count information carried in the latest DCI carrying the joint count information before the first DCI.

Optionally, in a case that a time domain position of the first DCI is a position in a second set, the first DCI carries the count information of joint scheduling DCI and the count information of single scheduling DCI. The second set may be a preset time domain position set different from at least one of the third set, the fourth set, or the first set. Or optionally, the second set may be a set of time domain positions including an overlapping part of the third set and the fourth set, that is, the time domain position of the first DCI belongs to both the third set and the fourth set, and accordingly, the first DCI simultaneously carries both the count information of joint scheduling DCI and the count information of single scheduling DCI. The count information of joint scheduling DCI and the count information of single scheduling DCI that are simultaneously carried in the first DCI may be the count information of joint scheduling DCI and the count information of single scheduling DCI carried in the latest DCI carrying the count information before the first DCI.

Or optionally, the count information of joint scheduling DCI is the count information of joint scheduling DCI carried in the first target DCI, and the first target DCI is the latest DCI carrying the count information of joint scheduling DCI before the first DCI. The count information of single scheduling DCI is the count information of single scheduling DCI carried in the second target DCI, and the second target DCI is the latest DCI carrying the count information of single scheduling DCI before the first DCI. In this embodiment, if the first target DCI only carries the count information of a piece of DCI, for example, the first target DCI only carries the count information of joint scheduling DCI, the count information of joint scheduling DCI carried in the first DCI is the count information of joint scheduling DCI carried in the first target DCI, and the count information of single scheduling DCI carried in the first DCI further needs to be determined according to the latest second target DCI carrying the count information of single scheduling DCI before the first DCI, that is, the count information of single scheduling DCI carried in the first DCI is the count information of single scheduling DCI carried in the second target DCI.

Optionally, after obtaining the first DCI carrying the count information, information feedback is performed according to the count information. If the first DCI carries the count information of joint scheduling DCI, in a case that the count information of joint scheduling DCI is a first value, feedback information corresponding to the joint scheduling DCI is not allowable to be transmitted in a physical uplink shared channel PUSCH; and/or, in a case that the count information of joint scheduling DCI is a second value, the feedback information corresponding to the joint scheduling DCI is allowable to be transmitted in the PUSCH.

In this embodiment, if the first DCI carries the count information of joint scheduling DCI, and the count information is only 1 bit, using an example in which the first value is 0 and the second value is 1, the first value of 0 means not allowed, and the second value of 1 means allowed. Optionally, if the count information of joint scheduling DCI is 0, it means that the feedback information corresponding to the joint scheduling DCI is not allowable to be transmitted in the PUSCH. Optionally, if the count information of joint scheduling DCI is 1, it means that the feedback information corresponding to the joint scheduling DCI is allowable to be transmitted in the PUSCH.

If the first DCI carries the count information of single scheduling DCI, in a case that the count information of single scheduling DCI is a third value, feedback information corresponding to the single scheduling DCI is not allowable to be transmitted in the PUSCH; and/or, in a case that the count information of single scheduling DCI is a fourth value, the feedback information corresponding to the single scheduling DCI is allowable to be transmitted in the PUSCH.

In this embodiment, if the first DCI carries the count information of single scheduling DCI, and the count information is only 1 bit, using an example in which the third value is 0 and the fourth value is 1, the third value of 0 means not allowed, and the fourth value of 1 means allowed.

Optionally, if the count information of single scheduling DCI is 0, it means that the feedback information corresponding to the single scheduling DCI is not allowable to be transmitted in the PUSCH. Optionally, if the count information of single scheduling DCI is 1, it means that the feedback information corresponding to the single scheduling DCI is allowable to be transmitted in the PUSCH.

It is to be noted that, the first DCI may alternatively simultaneously carry the count information of joint scheduling DCI and the count information of single scheduling DCI, and each piece of count information is only 1 bit. For example, the first DCI carries two 1-bits respectively corresponding to the count information of joint scheduling DCI and the count information of single scheduling DCI. Using an example in which 0 means not allowed and 1 means allowed, for example, when two bits are 11, it means that both the feedback information corresponding to the joint scheduling DCI and the feedback information corresponding to the single scheduling DCI are able to be transmitted in the PUSCH. Optionally, when the two bits are 00, it means that neither the feedback information corresponding to the joint scheduling DCI nor the feedback information corresponding to the single scheduling DCI is allowable to be transmitted in the PUSCH. Optionally, when the two bits are 10, it means that the feedback information corresponding to the joint scheduling DCI is not allowable to be transmitted in the PUSCH, and the feedback information corresponding to the single scheduling DCI is allowable to be transmitted in the PUSCH. Optionally, when the two bits are 01, it means that the feedback information corresponding to the joint scheduling DCI is allowable to be transmitted in the PUSCH, and the feedback information corresponding to the single scheduling DCI is not allowable to be transmitted in the PUSCH. It is to be noted that, this embodiment is aimed at the case where the joint scheduling DCI and the single scheduling DCI respectively use different count information fields, that is, the joint scheduling DCI and the single scheduling DCI are counted respectively.

Optionally, if the first DCI carries the joint count information of joint scheduling DCI and single scheduling DCI, in a case that the joint count information of joint scheduling DCI and single scheduling DCI is a fifth value, feedback information corresponding to the joint count information is not allowable to be transmitted in the PUSCH; and/or, in a case that the joint count information of joint scheduling DCI and single scheduling DCI is a sixth value, the feedback information corresponding to the joint count information is allowable to be transmitted in the PUSCH.

In this embodiment, if the first DCI carries the joint count information of joint scheduling DCI and single scheduling DCI, and the joint count information is only 1 bit, using an example in which the fifth value is 0 and the sixth value is 1, the fifth value of 0 means not allowed, and the sixth value of 1 means allowed. Optionally, if the joint count information is 0, it means that feedback information corresponding to the joint count information is not allowable to be transmitted in the PUSCH, where if there are feedback information corresponding to joint scheduling DCI and feedback information corresponding to single scheduling DCI, neither the feedback information corresponding to joint scheduling DCI nor the feedback information corresponding to single scheduling DCI is allowable to be transmitted in the PUSCH. Optionally, if the joint count information is 1, it means that feedback information corresponding to the joint count information is allowable to be transmitted in the PUSCH, where if there are feedback information corresponding to joint scheduling DCI and feedback information corresponding to single scheduling DCI, both the feedback information corresponding to joint scheduling DCI and feedback information corresponding to single scheduling DCI are able to be transmitted in the PUSCH. It is to be noted that, this embodiment is aimed at the case where the joint scheduling DCI and the single scheduling DCI use a same count information field, that is, the joint scheduling DCI and the single scheduling DCI are jointly counted.

The value of the foregoing count information and the meaning expressed by the value may be set according to the requirements, for example, 0 means not allowed, 1 means allowed, and the logic is similar, which is not described herein in detail.

Optionally, when the first DCI only carries the count information of joint scheduling DCI or count information of single scheduling DCI, the count information may alternatively be 2 bits. When the first DCI simultaneously carries the count information of joint scheduling DCI and the count information of single scheduling DCI, if each piece of count information is 2 bits, the first DCI totally carries two 2-bits respectively corresponding to the count information of joint scheduling DCI and the count information of single scheduling DCI.

Using an example in which the count information being 11 means not allowed, when the first DCI carries the count information of joint scheduling DCI, if the count information is 11, it means that the feedback information corresponding to the joint scheduling DCI is not allowable to be transmitted in the PUSCH; and when the first DCI carries the count information of single scheduling DCI, if the count information is 11, it means that the feedback information corresponding to single scheduling DCI is not allowable to be transmitted in the PUSCH. If the first DCI simultaneously carries the count information of joint scheduling DCI and the count information of single scheduling DCI and the two 2-bits are 11, it means that neither the feedback information corresponding to joint scheduling DCI nor the feedback information corresponding to single scheduling DCI is allowable to be transmitted in the PUSCH. It is to be noted that, this embodiment is aimed at the case where the joint scheduling DCI and the single scheduling DCI respectively use different count information fields, that is, the joint scheduling DCI and the single scheduling DCI are counted respectively.

Optionally, when the first DCI carries the joint count information of joint scheduling DCI and single scheduling DCI, the count information may alternatively be 2 bits. Using an example in which the count information being 11 means not allowed, if the joint count information is 11, it means that feedback information corresponding to the joint count information is not allowable to be transmitted in the PUSCH, where If there are feedback information corresponding to joint scheduling DCI and feedback information corresponding to single scheduling DCI, neither the feedback information corresponding to joint scheduling DCI nor the feedback information corresponding to single scheduling DCI is allowable to be transmitted in the PUSCH. It is to be noted that, this embodiment is aimed at the case where the joint scheduling DCI and the single scheduling DCI use a same count information field, that is, the joint scheduling DCI and the single scheduling DCI are jointly counted.

The value of the foregoing count information and the meaning expressed by the value may be set according to the requirements, for example, 00 means not allowed, and the logic is similar, which is not described herein in detail.

Optionally, in a case that the count information includes at least the count information of joint scheduling DCI and code block group (CBG) is configured to be used for transmission by a network side device, the count information of joint scheduling DCI includes N sub-count information fields, and each sub-count information field corresponds to a sub-codebook; and the N is a positive integer. In this embodiment, if the first DCI carries at least the count information for joint scheduling DCI and CBG is configured to be used for transmission, the count information of joint scheduling DCI includes N sub-count information fields (for example, including two sub-count information fields), each sub-count information field corresponds to a sub-codebook, and the user side device reports the feedback information to the network side device according to the sub-codebook.

Optionally, the count information carried in the first DCI obtained by the user side device may include at least one of a total number or a counting number, for example, including a tDAI and a cDAI. For example, the count information includes a tDAI.

In this embodiment of the present application, if the first DCI is single scheduling DCI Format 0-1, the joint scheduling DCI and the single scheduling DCI respectively use different DAI fields (that is, respectively indicate a count). Optionally, the count information carried in the first DCI includes two DAI fields or DAI groups, which are respectively equal to a DAI field or DAI group carried in the latest DCI carrying the count information of joint scheduling DCI before the first DCI and a DAI field or DAI group carried in the latest DCI carrying the count information of single scheduling DCI. Alternatively, the DAI carried in the first DCI is equal to a DAI carried in single scheduling DCI Format 1-1 that is latest before the first DCI and carries the count information.

If the first DCI is single scheduling DCI Format 0-1, and the joint scheduling DCI and single scheduling DCI use the same DAI field, the DAI carried in the first DCI is the DAI carried in the latest DCI carrying the count information before the first DCI.

If the first DCI is a DAI in DCI format 0-A1, the joint scheduling DCI and the single scheduling DCI respectively use different DAI fields (that is, respectively indicate a count). Optionally, the count information carried in the first DCI includes two DAI fields or DAI groups, which are respectively equal to a DAII field or DAI group carried in the latest DCI carrying the count information of joint scheduling DCI before the first DCI and a DAII field or DAI group carried in the latest DCI carrying the count information of single scheduling DCI. Alternatively, the DAI is equal to the DAI carried in joint scheduling DCI Format 1-A2 that is latest before the first DCI and carries the count information.

If the first DCI is a DAI in DCI format 0-A, and the joint scheduling DCI and single scheduling DCI use the same DAI field, the DAI carried in the first DCI is the DAI carried in the latest DCI carrying the count information before the first DCI.

Optionally, the content of the DAI may alternatively be determined according to the time domain position of the first DCI.

It is to be noted that, whether the count information carried in the first DCI is two pieces of count information or one piece of count information, if the value of the count information is not the value in the foregoing embodiment (for example, the count information being 11 means that the transmission is not allowed), for example, the value of the count information is actual count information for DCI, in this case, the bit number of the feedback information needs to be determined according to the actual count information for DCI.

In this embodiment of the present application, the DCI for scheduling uplink data obtained by the user side device can carry at least one of the count information of joint scheduling DCI, the count information of single scheduling DCI, or the joint count information of joint scheduling DCI and single scheduling DCI, to assist the user side device to determine the number or a counting number of the DCI and then determine feedback information. In this way, it can ensure that the user side device and the network side device have the same understanding of the feedback information, and the feedback reliability can be improved.

Figure 5:
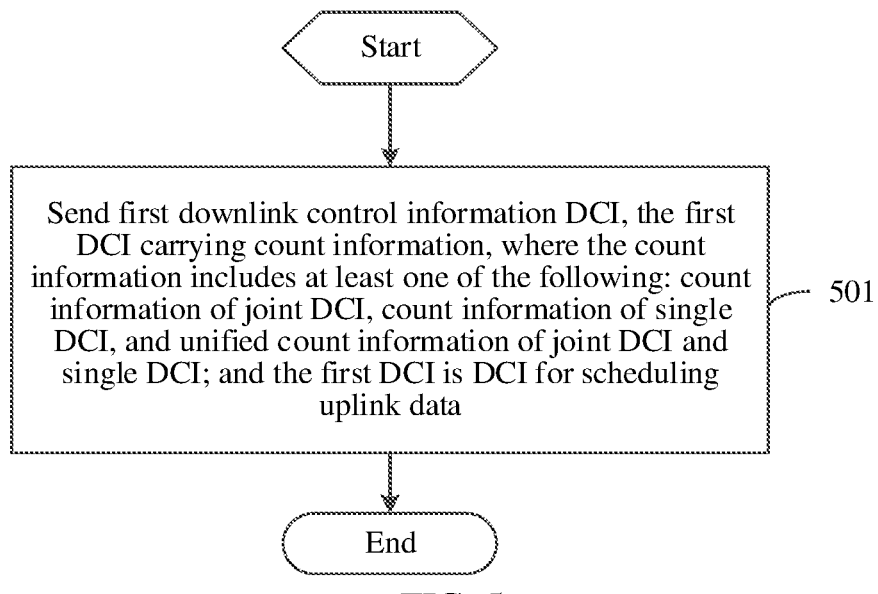
FIG. 5 is a schematic flowchart 2 of an information transmission method according to an embodiment of the present application.

As shown in FIG. 5, the embodiments of the present application provide an information transmission method, applied to a network side device, and including:

step 501: Send first downlink control information DCI, the first DCI carrying count information, where the first DCI is DCI for scheduling uplink data.

The count information includes at least one of the following: count information of joint scheduling DCI, count information of single scheduling DCI, or joint count information of joint scheduling DCI and single scheduling DCI.

The network side device sends the first DCI to the user side device, the first DCI carrying count information. The count information may include at least one of the count information of joint scheduling DCI, the count information of single scheduling DCI, or the joint count information of joint scheduling DCI and single scheduling DCI. The joint scheduling DCI is DCI for scheduling a plurality of uplinks or downlinks, and a format corresponding to the joint scheduling DCI for scheduling a plurality of uplinks may be: 0-A1, or a format corresponding to the joint scheduling DCI for scheduling a plurality of downlinks may be 1-A2, where A1 and A2 are positive integers. The single scheduling DCI is DCI for only scheduling one uplink or downlink.

The first DCI is DCI for scheduling uplink data, which is referred to as UL DCI. The DCI for scheduling downlink data is referred to as downlink (DL) DCI. The first DCI may be in a single scheduling DCI format, for example, DCI format 0-1, or may be in a joint scheduling DCI format, for example, DCI format 0-A1.

The first DCI may carry the count information of joint scheduling DCI and/or the count information of single scheduling DCI. In this case, the joint scheduling DCI and the single scheduling DCI respectively use different count information fields, that is, the joint scheduling DCI and the single scheduling DCI are counted respectively. Alternatively, the first DCI carries the joint count information for joint scheduling DCI and single scheduling DCI. In this case, the joint scheduling DCI and the single scheduling DCI use a same count information field, that is, the joint scheduling DCI and the single scheduling DCI are jointly counted.

In this embodiment of the present application, the first DCI sent to the user side device by the network side device carries count information including at least one of the count information of joint scheduling DCI, the count information of single scheduling DCI, or the joint count information of joint scheduling DCI and single scheduling DCI, which can assist the user side device to determine the number or a counting number of the DCI and then determine feedback information. In this way, it can ensure that the user side device and the network side device have the same understanding of the feedback information, and the feedback reliability can be improved.

Optionally, the count information of joint scheduling DCI is count information of joint scheduling DCI carried in first target DCI; and the first target DCI is latest DCI carrying the count information of joint scheduling DCI before the first DCI.

The count information of joint scheduling DCI may be count information of at least one of DCI for joint uplink scheduling or DCI for joint downlink scheduling. For example, when the count information of joint scheduling DCI is count information of DCI for joint downlink scheduling, the count information corresponding to a total number of joint scheduling DCI is the count information of joint scheduling DCI carried in the first target DCI, and the first target DCI is the latest DL DCI carrying the count information of joint scheduling DCI before the first DCI.

The first target DCI may be DCI that only carries the count information of joint scheduling DCI, that is, the first target DCI only carries the count information of its own type. The first target DCI may alternatively be DCI that simultaneously carries the count information of joint scheduling DCI and the count information of single scheduling DCI, that is, the first target DCI simultaneously carries count information of two types. The DCI that simultaneously carries the count information of joint scheduling DCI and the count information of single scheduling DCI may be joint scheduling DCI or single scheduling DCI.

The count information of joint scheduling DCI carried in the first DCI may be determined according to at least one of the format of the first DCI, the type of the first DCI (that is, joint scheduling DCI or single scheduling DCI), or the configuration of the network side device. Optionally, in a case that a first condition is met, the first DCI carries the count information of joint scheduling DCI. The first condition may include at least one of the following:

that the first DCI is DCI for joint uplink scheduling, that is, when the first DCI is joint UL DCI, the first DCI is configured to carry the count information of joint scheduling DCI;

that the first DCI is in a first format, for example, joint UL DCI format 0-A1, that is, when the first DCI is in the first format, the first DCI is configured to carry the count information of joint scheduling DCI;

that second DCI is configured by a network side device to carry count information of joint scheduling DCI; where the second DCI may be the first DCI, optionally, the first DCI may only carry the count information of joint scheduling DCI; and the second DCI may alternatively be at least one of other DCI, such as UL DCI, DL DCI, single scheduling DCI, or joint scheduling DCI;

that single scheduling DCI is not configured by a network side device, that is, when there is no single scheduling DCI, the first DCI carries the count information of joint scheduling DCI; or that a time domain position of the first DCI is a position in a third set. When the time domain position of the first DCI is a position in the third set, for example, the time domain position of the first DCI mod time domain position period is 1=X, the count information of joint scheduling DCI carried in the first DCI is the count information of joint scheduling DCI carried in latest DCI carrying the count information of joint scheduling DCI before the first DCI.

In this embodiment, when at least one of the foregoing first conditions is met, the first DCI carries the count information of joint scheduling DCI. Optionally, this embodiment is applicable to the case where the joint scheduling DCI and the single scheduling DCI respectively use different count information fields, that is, the joint scheduling DCI and the single scheduling DCI are counted respectively.

Optionally, if the first DCI is joint UL DCI format 0-A1, the count information carried in the first DCI is count information carried in joint DL DCI format 1-A2 that is latest before the first DCI; and/or, if the first DCI is single UL DCI format 0-1, the count information carried in the first DCI is count information carried in single DL DCI format 1-1 that is latest before the first DCI.

Optionally, in a case that latest DCI before the first DCI is joint scheduling DCI, the first DCI carries at least the count information of joint scheduling DCI. In this embodiment, if the latest DCI before the first DCI is joint scheduling DCI, the first DCI carries at least the count information of joint scheduling DCI.

Optionally, when the first DCI is joint UL DCI format, the first DCI carries at least the count information for joint scheduling DCI. For example, the first DCI is DCI format 0-A1, and the count information for joint scheduling DCI is count information of joint scheduling DCI carried in latest DCI (for example, joint DL DCI Format 1-A2) carrying the count information of joint scheduling DCI before the first DCI; Alternatively, when the first DCI is DCI format 0-A1, the first DCI carries the count information for joint DL DCI, and a tDAI carried therein is a tDAI carried in latest DCI (for example, joint DL DCI Format 1-A2) carrying the count information of joint scheduling DCI before the first DCI.

Optionally, the count information of single scheduling DCI is count information of single scheduling DCI carried in second target DCI; and the second target DCI is latest DCI carrying the count information of single scheduling DCI before the first DCI.

The count information of single scheduling DCI may be count information of at least one of DCI for single uplink scheduling or DCI for single downlink scheduling. For example, when the count information of single scheduling DCI is the count information of DCI for single downlink scheduling, the corresponding count information of a total number of single scheduling DCI is the count information of single scheduling DCI carried in the second target DCI, where the second target DCI is latest DCI carrying the count information of single scheduling DCI before the first DCI.

The second target DCI may be DCI that only carries the count information of single scheduling DCI, that is, the second target DCI only carries the count information for its own type. The second target DCI may alternatively be DCI that simultaneously carries the count information of single scheduling DCI and the count information of joint scheduling DCI, that is, the second target DCI simultaneously carries count information of two types. The DCI that simultaneously carries the count information of single scheduling DCI and the count information of joint scheduling DCI may be joint scheduling DCI or single scheduling DCI.

The count information of single scheduling DCI carried in the first DCI may be determined according to at least one of the format of the first DCI, the type of the first DCI, or the configuration of the network side device. Optionally, in a case that a second condition is met, the first DCI carries the count information of single scheduling DCI. The second condition may include at least one of the following:

that the first DCI is DCI for single uplink scheduling, that is, when the first DCI is single UL DCI, the first DCI carries the count information of single scheduling DCI;

that the first DCI is in a second format, for example, the format of the first DCI is DCI format 0-1, that is, when the first DCI is in the second format, the first DCI carries the count information of single scheduling DCI;

that third DCI is configured by a network side device to carry count information of single scheduling DCI; where the third DCI may be the first DCI, optionally, the first DCI may only carry the count information of single scheduling DCI; and the third DCI may alternatively be at least one of other DCI, such as UL DCI, DL DCI, single scheduling DCI, or joint scheduling DCI;

that joint scheduling DCI is not configured by a network side device, that is, when there is no joint scheduling DCI, the first DCI carries the count information of single scheduling DCI; or that a time domain position of the first DCI is a position in a fourth set. When the time domain position of the first DCI is a position in the fourth set, for example, the time domain position of the first DCI mod time domain position period is 2=Y, the count information of single scheduling DCI carried in the first DCI is the count information of single scheduling DCI carried in latest DCI carrying the count information of single scheduling DCI before the first DCI. Mod represents a modulus operation.

In this embodiment, when at least one of the second conditions is met, the first DCI carries the count information of single scheduling DCI, and the count information of single scheduling DCI is equal to the count information carried in latest single DL DCI (for example, DCI Format 1-1) before the first DCI which the carries count information. This embodiment is applicable to the case where the joint scheduling DCI and the single scheduling DCI respectively use different count information fields, that is, the joint scheduling DCI and the single scheduling DCI are counted respectively.

Optionally, in a case that latest DCI before the first DCI is single scheduling DCI, the first DCI carries at least the count information of single scheduling DCI. In this embodiment, if the latest DCI before the first DCI is single scheduling DCI, the first DCI carries at least the count information of single scheduling DCI. In a case that the first DCI carries the count information of single scheduling DCI, the first DCI may further carry other count information, such as the count information of joint scheduling DCI.

Optionally, if the first DCI is in an existing single scheduling DCI format, the first DCI carries at least count information for single scheduling DCI, and the count information of single scheduling DCI is count information of single scheduling DCI carried in latest DCI (for example, DCI Format 1-1) carrying the count information of single scheduling DCI before the first DCI; alternatively, when the first DCI is DCI format 0-1 and carries the count information for single DL DCI, a tDAI carried in the first DCI is configured to be a tDAI carried in latest DCI (for example, single DL DCI Format 1-1) carrying the count information of single scheduling DCI before the first DCI.

The first DCI may alternatively carry a plurality of pieces of count information, such as carrying count information respectively corresponding to joint scheduling DCI and single scheduling DCI. In this case, the joint scheduling DCI and the single scheduling DCI respectively use different count information fields, that is, the joint scheduling DCI and the single scheduling DCI are counted respectively. For example, the first DCI carries two tDAIs respectively corresponding to a total number of joint scheduling DCI and a total number of single scheduling DCI. The count information corresponding to the total number of joint scheduling DCI is the count information of joint scheduling DCI carried in the latest DCI carrying the count information of joint scheduling DCI before the first DCI, that is, the first target DCI is the latest DCI carrying the count information of joint scheduling DCI before the first DCI; and/or, the count information corresponding to the total number of single scheduling DCI is the count information of single scheduling DCI carried in the latest DCI carrying the count information of single scheduling DCI before the first DCI, that is, the second target DCI is the latest DCI carrying the count information of single scheduling DCI before the first DCI.

Optionally, the joint count information of joint scheduling DCI and single scheduling DCI is joint count information carried in third target DCI; and the third target DCI is latest DCI carrying the joint count information before the first DCI.

In this embodiment, the joint scheduling DCI and the single scheduling DCI use the same count information field, that is, the joint scheduling DCI and the single scheduling DCI are jointly counted. If the joint scheduling DCI and the single scheduling DCI use the same count information field, the joint count information is the joint count information carried in the latest DCI carrying the joint count information before the first DCI.

Using an example in which the first DCI is in an existing single scheduling DCI format, for example, DCI format 0-1, the count information is joint count information carried in the latest DCI carrying the joint count information before the first DCI; alternatively, using an example in which the first DCI is a joint UL, for example, DCI format 0-A1, the count information is the joint count information carried in the latest DCI carrying the joint count information before the first DCI.

Optionally, in a case that a time domain position of the first DCI is a position in a first set, the first DCI is configured to carry the joint count information of joint scheduling DCI and single scheduling DCI. The first set may be a preset time domain position set different from at least one of the third set or the fourth set, or the first set may be a time domain position set including an overlapping part of the third set and the fourth set. When the time domain position of the first DCI is a position in the first set, the first DCI carries the joint count information of joint scheduling DCI and single scheduling DCI, and the joint count information is the joint count information carried in the latest DCI carrying the joint count information before the first DCI.

Optionally, in a case that a time domain position of the first DCI is a position in a second set, the first DCI carries the count information of joint scheduling DCI and the count information of single scheduling DCI. The second set may be a preset time domain position set different from at least one of the third set, the fourth set, or the first set, or optionally, the second set may be a set of time domain positions including an overlapping part of the third set and the fourth set, that is, the time domain position of the first DCI belongs to both the third set and the fourth set, and accordingly, the first DCI simultaneously carries both the count information of joint scheduling DCI and the count information of single scheduling DCI. The count information of joint scheduling DCI and the count information of single scheduling DCI that are simultaneously carried in the first DCI may be the count information of joint scheduling DCI and the count information of single scheduling DCI carried in the latest DCI carrying the count information before the first DCI.

Optionally, the count information of joint scheduling DCI is the count information of joint scheduling DCI carried in the first target DCI, and the first target DCI is the latest DCI carrying the count information of joint scheduling DCI before the first DCI. The count information of single scheduling DCI is the count information of single scheduling DCI carried in the second target DCI, and the second target DCI is the latest DCI carrying the count information of single scheduling DCI before the first DCI. In this embodiment, if the first target DCI only carries the count information of a piece of DCI, for example, the first target DCI only carries the count information of joint scheduling DCI, the count information of joint scheduling DCI carried in the first DCI is the count information of joint scheduling DCI carried in the first target DCI, and the count information of single scheduling DCI carried in the first DCI further needs to be determined according to the latest second target DCI carrying the count information of single scheduling DCI before the first DCI, that is, the count information of single scheduling DCI carried in the first DCI is the count information of single scheduling DCI carried in the second target DCI.

The count information carried in the first DCI is used for instructing the user side device to perform information feedback according to the count information. If the first DCI carries the count information of joint scheduling DCI, in a case that the count information of joint scheduling DCI is a first value, feedback information corresponding to the joint scheduling DCI is not allowable to be transmitted in a physical uplink shared channel PUSCH; and/or, in a case that the count information of joint scheduling DCI is a second value, the feedback information corresponding to the joint scheduling DCI is allowable to be transmitted in the PUSCH.

In this embodiment, using an example in which the first DCI carries the count information of joint scheduling DCI, the count information is only 1 bit, and the first value is 0 and the second value is 1, the first value of 0 means not allowed, and the second value of 1 means allowed. Optionally, if the count information of joint scheduling DCI is 0, it means that when the user side device feeds back the feedback information corresponding to the joint scheduling DCI, the feedback information is not allowable to be transmitted in the PUSCH. Optionally, if the count information of joint scheduling DCI is 1, it means that when the user side device feeds back the feedback information corresponding to the joint scheduling DCI, the feedback information is allowable to be transmitted in the PUSCH.

If the first DCI carries the count information of single scheduling DCI, in a case that the count information of single scheduling DCI is a third value, feedback information corresponding to the single scheduling DCI is not allowable to be transmitted in the PUSCH; and/or, in a case that the count information of single scheduling DCI is a fourth value, the feedback information corresponding to the single scheduling DCI is allowable to be transmitted in the PUSCH.

In this embodiment, using an example in which the first DCI carries the count information of single scheduling DCI, the count information is only 1 bit, and the third value is 0 and the fourth value is 1, the third value of 0 means not allowed, and the fourth value of 1 means allowed. Optionally, if the count information of single scheduling DCI is 0, it means that when the user side device feeds back the feedback information corresponding to single scheduling DCI, the feedback information is not allowable to be transmitted in the PUSCH. Optionally, if the count information of single scheduling DCI is 1, it means that when the user side device feeds back the feedback information corresponding to single scheduling DCI, the feedback information is allowable to be transmitted in the PUSCH.

The first DCI may alternatively simultaneously carry the count information of joint scheduling DCI and the count information of single scheduling DCI, and each piece of count information is only 1 bit. For example, the first DCI carries two 1-bits respectively corresponding to the count information of joint scheduling DCI and the count information of single scheduling DCI. Using an example in which 0 means not allowed and 1 means allowed, for example, when two bits are 11, it means that when the user side device feeds back both the feedback information corresponding to the joint scheduling DCI and the feedback information corresponding to the single scheduling DCI, both the feedback information corresponding to the joint scheduling DCI and the feedback information corresponding to the single scheduling DCI are able to be transmitted in the PUSCH. Optionally, when the two bits are 00, it means that when the user side device feeds back the feedback information corresponding to the joint scheduling DCI and the feedback information corresponding to the single scheduling DCI, neither the feedback information corresponding to the joint scheduling DCI nor the feedback information corresponding to the single scheduling DCI is allowable to be transmitted in the PUSCH. Optionally, when the two bits are 10, it means that when the user side device feeds back the feedback information corresponding to the joint scheduling DCI, the feedback information corresponding to the joint scheduling DCI is not allowable to be transmitted in the PUSCH, and when the user side device feeds back the feedback information corresponding to the single scheduling DCI, the feedback information corresponding to the single scheduling DCI is allowable to be transmitted in the PUSCH. Optionally, when the two bits are 01, it means that when the user side device feeds back the feedback information corresponding to the joint scheduling DCI, the feedback information corresponding to the joint scheduling DCI is allowable to be transmitted in the PUSCH, and when the user side device feeds back the feedback information corresponding to the single scheduling DCI, the feedback information corresponding to the single scheduling DCI is not allowable to be transmitted in the PUSCH. It is to be noted that, this embodiment is aimed at the case where the joint scheduling DCI and the single scheduling DCI respectively use different count information fields, that is, the joint scheduling DCI and the single scheduling DCI are counted respectively.

Optionally, if the first DCI carries the joint count information of joint scheduling DCI and single scheduling DCI, in a case that the joint count information of joint scheduling DCI and single scheduling DCI is a fifth value, feedback information corresponding to the joint count information is not allowable to be transmitted in the PUSCH; and/or, in a case that the joint count information of joint scheduling DCI and single scheduling DCI is a sixth value, the feedback information corresponding to the joint count information is allowable to be transmitted in the PUSCH.

In this embodiment, if the first DCI carries the joint count information of joint scheduling DCI and single scheduling DCI, using an example in which the joint count information is only 1 bit, and the fifth value is 0 and the sixth value is 1, the fifth value of 0 means not allowed, and the sixth value of 1 means allowed. Optionally, if the joint count information is 0, it means that when the user side device feeds back feedback information corresponding to the joint count information, the feedback information corresponding to the joint count information is not allowable to be transmitted in the PUSCH, where if there are feedback information corresponding to joint scheduling DCI and feedback information corresponding to single scheduling DCI, neither the feedback information corresponding to joint scheduling DCI nor the feedback information corresponding to single scheduling DCI is allowable to be transmitted in the PUSCH. Optionally, if the joint count information is 1, it means that when the user side device feeds back feedback information corresponding to the joint count information, the feedback information corresponding to the joint count information is allowable to be transmitted in the PUSCH, where if there are feedback information corresponding to joint scheduling DCI and feedback information corresponding to single scheduling DCI, both the feedback information corresponding to joint scheduling DCI and feedback information corresponding to single scheduling DCI are able to be transmitted in the PUSCH. It is to be noted that, this embodiment is aimed at the case where the joint scheduling DCI and the single scheduling DCI use a same count information field, that is, the joint scheduling DCI and the single scheduling DCI are jointly counted.

Optionally, the first DCI may only carry the count information of joint scheduling DCI or count information of single scheduling DCI, and in this case, the count information may alternatively be 2 bits. When the first DCI simultaneously carries the count information of joint scheduling DCI and the count information of single scheduling DCI, if each piece of count information is 2 bits, the first DCI totally carries two 2-bits respectively corresponding to the count information of joint scheduling DCI and the count information of single scheduling DCI.

Using an example in which the count information being 11 means not allowed, when the first DCI carries the count information of joint scheduling DCI, if the count information is 11, it means that when the user side device feeds back the feedback information corresponding to the joint scheduling DCI, the feedback information corresponding to the joint scheduling DCI is not allowable to be transmitted in the PUSCH; and when the first DCI carries the count information of single scheduling DCI, if the count information is 11, it means that when the user side device feeds back the feedback information corresponding to single scheduling DCI, the feedback information corresponding to single scheduling DCI is not allowable to be transmitted in the PUSCH. If the first DCI simultaneously carries the count information of joint scheduling DCI and the count information of single scheduling DCI and the two 2-bits are 11, it means that when the user side device feeds back the feedback information corresponding to joint scheduling DCI and the feedback information corresponding to single scheduling DCI, neither the feedback information corresponding to joint scheduling DCI nor the feedback information corresponding to single scheduling DCI is allowable to be transmitted in the PUSCH. It is to be noted that, this embodiment is aimed at the case where the joint scheduling DCI and the single scheduling DCI respectively use different count information fields, that is, the joint scheduling DCI and the single scheduling DCI are counted respectively.

Optionally, when the first DCI carries the joint count information of joint scheduling DCI and single scheduling DCI, the count information may alternatively be 2 bits. Using an example in which the count information being 11 means not allowed, if the joint count information is 11, it means that when the user side device feeds back the feedback information corresponding to the joint count information, the feedback information corresponding to the joint count information is not allowable to be transmitted in the PUSCH, where if there are feedback information corresponding to joint scheduling DCI and feedback information corresponding to single scheduling DCI, neither the feedback information corresponding to joint scheduling DCI nor the feedback information corresponding to single scheduling DCI is allowable to be transmitted in the PUSCH. It is to be noted that, this embodiment is aimed at the case where the joint scheduling DCI and the single scheduling DCI use a same count information field, that is, the joint scheduling DCI and the single scheduling DCI are jointly counted.

Optionally, in a case that the count information includes at least the count information of joint scheduling DCI and code block group CBG is configured to be used for transmission by a network side device, the count information of joint scheduling DCI includes N sub-count information fields, and each sub-count information field corresponds to a sub-codebook; and the N is a positive integer. In a case that in the network side device, the first DCI is configured to carry at least the count information for joint scheduling DCI, and code block group CBG is configured to be used for transmission, the count information of joint scheduling DCI is configured to include N sub-count information fields (for example, including two sub-count information fields), each sub-count information field corresponds to a sub-codebook, so that the user side device reports the feedback information according to the sub-codebook.

Optionally, the count information includes at least one of a total number or a counting number. For example, the count information includes a tDAI and a cDAI. For example, the count information includes a tDAI.

It is to be noted that, whether the count information carried in the first DCI is two pieces of count information or one piece of count information, if the value of the count information is not the value in the foregoing embodiment (for example, the count information being 11 means that the transmission is not allowed), for example, the value of the count information is actual count information for DCI, in this case, the bit number of the feedback information needs to be determined according to the actual count information for DCI.

It is to be noted that, all descriptions about the network side device in the foregoing embodiment applied to a user side device are applicable to the embodiment applied to a network side device, and the same technical effect can also be achieved.

In this embodiment of the present application, the first DCI sent to the user side device by the network side device carries count information that may include at least one of the count information of joint scheduling DCI, the count information of single scheduling DCI, or the joint count information of joint scheduling DCI and single scheduling DCI, which can assist the user side device to determine the number or a counting number of the DCI and then determine feedback information. In this way, it can ensure that the user side device and the network side device have the same understanding of the feedback information, and the feedback reliability can be improved.

Figure 6:
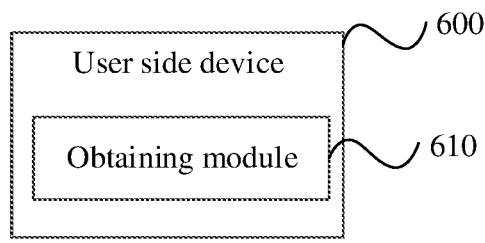
FIG. 6 is a schematic modular diagram of a user side device according to an embodiment of the present application.

As shown in FIG. 6, a user side device 600 provided in an embodiment of the present application includes:
  an obtaining module 610, configured to obtain first downlink control information DCI, the first DCI carrying count information, where
  the count information includes at least one of the following: count information of joint scheduling DCI, count information of single scheduling DCI, or joint count information of joint scheduling DCI and single scheduling DCI; and
  the first DCI is DCI for scheduling uplink data.

Optionally, the count information of joint scheduling DCI is count information of joint scheduling DCI carried in first target DCI; and the first target DCI is latest DCI carrying the count information of joint scheduling DCI before the first DCI.

Optionally, in a case that a first condition is met, the first DCI carries the count information of joint scheduling DCI.

Optionally, the first condition includes at least one of the following:
that the first DCI is DCI for joint uplink scheduling;
that the first DCI is in a first format;
that second DCI is configured by a network side device to carry count information of joint scheduling DCI;
that single scheduling DCI is not configured by a network side device; or
that a time domain position of the first DCI is a position in a third set.

Optionally, in a case that latest DCI before the first DCI is joint scheduling DCI, the first DCI carries at least the count information of joint scheduling DCI.

Optionally, the count information of single scheduling DCI is count information of single scheduling DCI carried in second target DCI; and the second target DCI is latest DCI carrying the count information of single scheduling DCI before the first DCI.

Optionally, in a case that a second condition is met, the first DCI carries the count information of single scheduling DCI.

Optionally, the second condition includes at least one of the following:
that the first DCI is DCI for single uplink scheduling;
that the first DCI is in a second format;
that third DCI is configured by a network side device to carry count information of single scheduling DCI;
that joint scheduling DCI is not configured by a network side device; or that a time domain position of the first DCI is a position in a fourth set.

Optionally, in a case that latest DCI before the first DCI is single scheduling DCI, the first DCI carries at least the count information of single scheduling DCI.

Optionally, the joint count information of joint scheduling DCI and single scheduling DCI is joint count information carried in third target DCI; and
the third target DCI is latest DCI carrying the joint count information before the first DCI.

Optionally, in a case that a time domain position of the first DCI is a position in a first set, the first DCI carries the joint count information of joint scheduling DCI and single scheduling DCI.

Optionally, in a case that a time domain position of the first DCI is a position in a second set, the first DCI carries the count information of joint scheduling DCI and the count information of single scheduling DCI.

Optionally, in a case that the count information of joint scheduling DCI is a first value, feedback information corresponding to the joint scheduling DCI is not allowable to be transmitted in a physical uplink shared channel PUSCH; and/or
in a case that the count information of joint scheduling DCI is a second value, the feedback information corresponding to the joint scheduling DCI is allowable to be transmitted in the PUSCH.

Optionally, in a case that the count information of single scheduling DCI is a third value, feedback information corresponding to the single scheduling DCI is not allowable to be transmitted in a PUSCH; and/or
in a case that the count information of single scheduling DCI is a fourth value, the feedback information corresponding to the single scheduling DCI is allowable to be transmitted in the PUSCH.

Optionally, in a case that the joint count information of joint scheduling DCI and single scheduling DCI is a fifth value, feedback information corresponding to the joint count information is not allowable to be transmitted in a PUSCH; and/or
in a case that the joint count information of joint scheduling DCI and single scheduling DCI is a sixth value, the feedback information corresponding to the joint count information is allowable to be transmitted in the PUSCH.

Optionally, in a case that the count information includes at least the count information of joint scheduling DCI and code block group CBG is configured to be used for transmission by a network side device, the count information of joint scheduling DCI includes N sub-count information fields, and each sub-count information field corresponds to a sub-codebook; and
the N is a positive integer.

Optionally, the count information of joint scheduling DCI is count information of DCI for joint downlink scheduling.

Optionally, the count information of single scheduling DCI is count information of DCI for single downlink scheduling.

Optionally, the count information includes at least one of a total number or a counting number.

It is to be noted that, this embodiment of the user side device corresponds to the foregoing embodiment of the information transmission method applied to a user side device, all the implementations of the foregoing embodiments are applicable to this user side device embodiment, and the same technical effect can also be achieved.

In this embodiment of the present application, the DCI for scheduling uplink data obtained by the user side device can carry at least one of the count information of joint scheduling DCI, the count information of single scheduling DCI, or the joint count information of joint scheduling DCI and single scheduling DCI, to assist the user side device to determine the number or a counting number of the DCI and then determine feedback information. In this way, it can ensure that the user side device and the network side device have the same understanding of the feedback information, and the feedback reliability can be improved.

Figure 7:
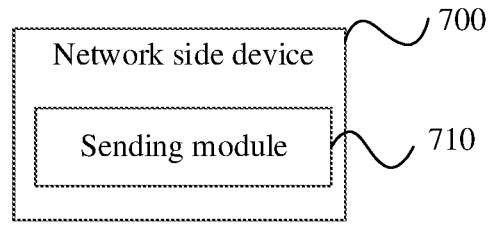
FIG. 7 is a schematic modular diagram of a network side device according to an embodiment of the present application.

As shown in FIG. 7, a network side device 700 provided in an embodiment of the present application includes:
a sending module 710, configured to send first downlink control information DCI, the first DCI carrying count information, where
the count information includes at least one of the following: count information of joint scheduling DCI, count information of single scheduling DCI, or joint count information of joint scheduling DCI and single scheduling DCI; and
the first DCI is DCI for scheduling uplink data.

Optionally, the count information of joint scheduling DCI is count information of joint scheduling DCI carried in first target DCI; and
the first target DCI is latest DCI carrying the count information of joint scheduling DCI before the first DCI.

Optionally, in a case that a first condition is met, the first DCI carries the count information of joint scheduling DCI.

Optionally, the first condition includes at least one of the following:
that the first DCI is DCI for joint uplink scheduling;
that the first DCI is in a first format;

that second DCI is configured by a network side device to carry count information of joint scheduling DCI;

that single scheduling DCI is not configured by a network side device; or that a time domain position of the first DCI is a position in a third set.

Optionally, in a case that latest DCI before the first DCI is joint scheduling DCI, the first DCI carries at least the count information of joint scheduling DCI.

Optionally, the count information of single scheduling DCI is count information of single scheduling DCI carried in second target DCI; and the second target DCI is latest DCI carrying the count information of single scheduling DCI before the first DCI.

Optionally, in a case that a second condition is met, the first DCI carries the count information of single scheduling DCI.

Optionally, the second condition includes at least one of the following:

that the first DCI is DCI for single uplink scheduling;

that the first DCI is in a second format;

that third DCI is configured by a network side device to carry count information of single scheduling DCI;

that joint scheduling DCI is not configured by a network side device; or that a time domain position of the first DCI is a position in a fourth set.

Optionally, in a case that latest DCI before the first DCI is single scheduling DCI, the first DCI carries at least the count information of single scheduling DCI.

Optionally, the joint count information of joint scheduling DCI and single scheduling DCI is joint count information carried in third target DCI; and the third target DCI is latest DCI carrying the joint count information before the first DCI.

Optionally, in a case that a time domain position of the first DCI is a position in a first set, the first DCI carries the joint count information of joint scheduling DCI and single scheduling DCI.

Optionally, in a case that a time domain position of the first DCI is a position in a second set, the first DCI carries the count information of joint scheduling DCI and the count information of single scheduling DCI.

Optionally, in a case that the count information of joint scheduling DCI is a first value, feedback information corresponding to the joint scheduling DCI is not allowable to be transmitted in a physical uplink shared channel PUSCH; and/or in a case that the count information of joint scheduling DCI is a second value, the feedback information corresponding to the joint scheduling DCI is allowable to be transmitted in the PUSCH.

Optionally, in a case that the count information of single scheduling DCI is a third value, feedback information corresponding to the single scheduling DCI is not allowable to be transmitted in a PUSCH; and/or in a case that the count information of single scheduling DCI is a fourth value, the feedback information corresponding to the single scheduling DCI is allowable to be transmitted in the PUSCH.

Optionally, in a case that the joint count information of joint scheduling DCI and single scheduling DCI is a fifth value, feedback information corresponding to the joint count information is not allowable to be transmitted in a PUSCH; and/or in a case that the joint count information of joint scheduling DCI and single scheduling DCI is a sixth value, the feedback information corresponding to the joint count information is allowable to be transmitted in the PUSCH.

Optionally, in a case that the count information includes at least the count information of joint scheduling DCI and code block group CBG is configured to be used for transmission by a network side device, the count information of joint scheduling DCI includes N sub-count information fields, and each sub-count information field corresponds to a sub-codebook; and the N is a positive integer.

Optionally, the count information of joint scheduling DCI is count information of DCI for joint downlink scheduling.

Optionally, the count information of single scheduling DCI is count information of DCI for single downlink scheduling.

Optionally, the count information includes at least one of a total number or a counting number.

It is to be noted that, this network side device embodiment is a network side device corresponding to the foregoing information transmission method applied to a network side device, all the implementations of the foregoing embodiments are applicable to this network side device embodiment, and the same technical effect can also be achieved.

In this embodiment of the present application, the first DCI sent to the user side device by the network side device carries count information carrying at least one of the count information of joint scheduling DCI, the count information of single scheduling DCI, or the joint count information of joint scheduling DCI and single scheduling DCI, which can assist the user side device to determine the number or a counting number of the DCI and then determine feedback information. In this way, it can ensure that the user side device and the network side device have the same understanding of the feedback information, and the feedback reliability can be improved.

Figure 8:
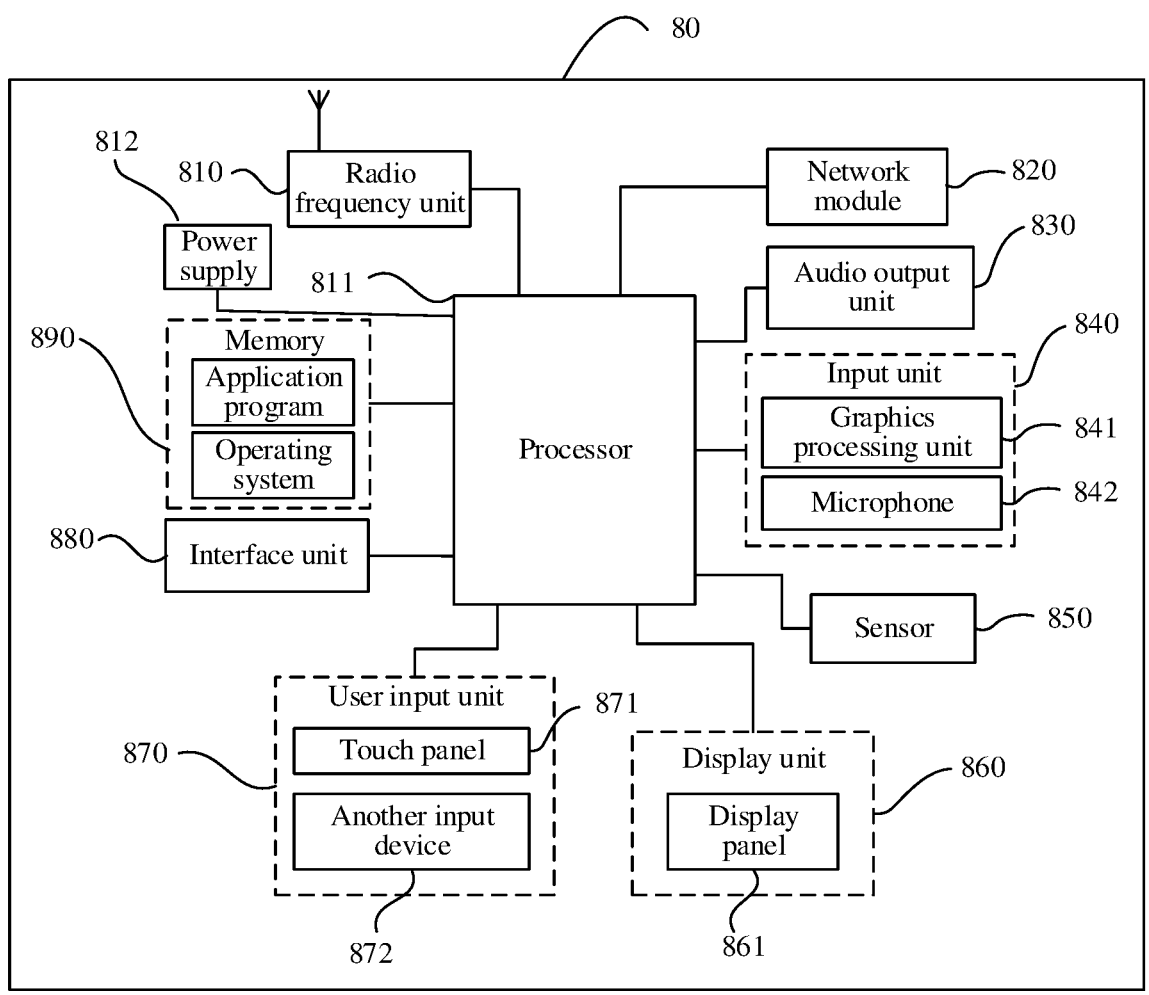
FIG. 8 is a structural block diagram of a user side device according to an embodiment of the present application.

FIG. 8 is a schematic diagram of a hardware structure of a user side device implementing an embodiment of the present application.

The user side device 80 includes, but is not limited to, components such as a radio frequency unit 810, a network module 820, an audio output unit 830, an input unit 840, a sensor 850, a display unit 860, a user input unit 870, an interface unit 880, a memory 890, a processor 811, and a power supply 812. A person skilled in the art may understand that the structure of the user side device shown in FIG. 8 does not constitute a limitation to the user side device, and the user side device may include more components or fewer components than those shown in the figure, or some components may be combined, or a different component arrangement may be used. In an embodiment of the present application, the user side device includes, but is not limited to, a mobile phone, a tablet computer, a notebook computer, a palmtop computer, an in-vehicle terminal, a wearable device, a pedometer, and the like.

The radio frequency unit 810 is configured to obtain first downlink control information DCI, the first DCI carrying count information, where the count information includes at least one of the following: count information of joint scheduling DCI, count information of single scheduling DCI, or joint count information of joint scheduling DCI and single scheduling DCI; and the first DCI is DCI for scheduling uplink data.

It is to be understood that, in this embodiment of the present application, the radio frequency unit 810 may be configured to transmit and receive information or transmit and receive signals during a call. For example, the radio frequency unit 810 receives downlink data from the network side device, and then sends the downlink data to the processor 811 for processing. In addition, the radio frequency unit 810 sends uplink data to network side device. Generally, the radio frequency unit 810 includes, but is not limited to, an antenna, at least one amplifier, a transceiver, a coupler, a low noise amplifier, a duplexer, and the like. In addition, the radio frequency unit 810 may further communicate with another device through a wireless communication system and a network.

The user side device provides wireless broadband Internet access for the user by using the network module 820, such as helping the user to send and receive emails, browse web pages, access streaming media content, and the like.

The audio output unit 830 may convert audio data received by the radio frequency unit 810 or the network module 820 or stored in the memory 890 into audio signals, and output the audio signals as sounds. In addition, the audio output unit 830 may further provide audio output (for example, a call signal receiving sound and a message receiving sound) that is related to a specific function executed by the user side device 80. The audio output unit 830 includes a speaker, a buzzer, a receiver, and the like.

The input unit 840 is configured to receive an audio or video signal. The input unit 840 may include a graphics processing unit (GPU) 841 and a microphone 842. The graphics processing unit 841 performs processing on image data of a static picture or a video acquired by an image acquisition apparatus (for example, a camera) in a video acquisition mode or an image acquisition mode. A processed image frame may be displayed on the display unit 860. The image frame processed by the graphics processing unit 841 may be stored in the memory 890 (or another storage medium) or sent through the radio frequency unit 810 or the network module 820. The microphone 842 may receive a sound and can process the sound into audio data. The processed audio data may be converted, in a phone call mode, to a format that can be sent to a mobile communication network side device through the radio frequency unit 810 to output.

The user side device 80 further includes at least one sensor 850, such as an optical sensor, a motion sensor, and other sensors. For example, the optical sensor includes an ambient light sensor and a proximity sensor. The ambient light sensor can adjust luminance of a display panel 861 according to brightness of the ambient light. The proximity sensor may switch off the display panel 861 and/or backlight when the user side device 80 is moved to the ear. As a type of the motion sensor, an accelerometer sensor may detect magnitudes of acceleration in various directions (generally, on three axes), may detect a magnitude and a direction of gravity when the accelerometer sensor is stationary, and may be used to recognize a terminal gesture (for example, switching between landscape orientation and portrait orientation, a related game, and magnetometer posture calibration), a function related to vibration recognition (such as a pedometer and a knock), and the like. The sensor 850 may further include a fingerprint sensor, a pressure sensor, an iris sensor, a molecular sensor, a gyroscope, a barometer, a hygrometer, a thermometer, an infrared sensor, and the like, which is not described herein in detail.

The display unit 860 is configured to display information inputted by the user or information provided for the user. The display unit 860 may include the display panel 861. The display panel 861 may be configured in a form of a liquid crystal display (LCD), an organic light-emitting diode (OLED), or the like.

The user input unit 870 may be configured to receive input digit or character information, and generate a keyboard signal input related to a user setting and function control of the user side device. For example, the user input unit 870 includes a touch panel 871 and another input device 872. The touch panel 871, which is also referred to as a touchscreen, can collect a touch operation of the user on or near the touch panel (for example, an operation of the user on or near the touch panel 871 by using any suitable object or attachment such as a finger or a stylus). The touch panel 871 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and transmits the touch point coordinates to the processor 811. In addition, the touch controller receives a command transmitted by the processor 811 and executes the command. In addition, the touch panel 871 may be implemented by using various types, such as a resistive type, a capacitance type, an infrared type, and a surface acoustic wave type. In addition to the touch panel 871, the user input unit 870 may further include the another input device 872. For example, the another input device 872 may include, but is not limited to, a physical keyboard, a functional key (for example, a volume control key or a switch key), a track ball, a mouse, and a joystick, which is not described herein in detail.

Furthermore, the touch panel 871 may cover the display panel 861. After detecting a touch operation on or near the touch panel, the touch panel 871 transfers the touch operation to the processor 811, to determine a type of a touch event. Then, the processor 811 provides a corresponding visual output on the display panel 861 according to the type of the touch event. In FIG. 8, the touch panel 871 and the display panel 861 are used as two independent parts to implement input and output functions of the user side device. However, in some embodiments, the touch panel 871 and the display panel 861 may be integrated to implement the input and output functions of the user side device, which is not specifically limited herein.

The interface unit 880 is an interface for connecting an external apparatus and the user side device 80. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 880 may be configured to receive an input (for example, data information or power) from an external apparatus, and transmit the received input to one or more elements in the user side device 80, or may be configured to transmit data between the user side device 80 and the external apparatus.

The memory 890 may be configured to store a software program and various data. The memory 890 may mainly include a program storage area and a data storage area. The program storage area may store an operating system, an application program required by at least one function (for example, a sound playback function and an image display function), and the like. The data storage area may store data (for example, audio data and a phone book) created according to use of the mobile phone. In addition, the memory 890 may include a high speed random access memory, and may further include a non-volatile memory, such as at least one magnetic disk storage device, a flash memory device, or other non-volatile solid state storage devices.

The processor 811 is the control center of the user side device, and is connected to various parts of the entire user side device by using various interfaces and lines. The processor 811 runs or executes a software program and/or module stored in the memory 890, and invokes data stored in the memory 890, to perform various functions and data processing of the user side device, thereby performing overall monitoring on the user side device. Optionally, the processor 811 may include one or more processing units. For example, the processor 811 may integrate an application processor and a modem processor. The application processor mainly processes an operating system, a user interface, an application program, and the like. The modem processor mainly processes wireless communication. It may be understood that the modem processor may alternatively not be integrated into the processor 811.

The user side device 80 may further include the power supply 812 (for example, a battery) for supplying power to the components. For example, the power supply 812 may be logically connected to the processor 811 by a power management system, thereby implementing functions such as charging, discharging, and power consumption management by using the power management system.

In addition, the user side device 80 includes some functional modules that are not shown, which are not described herein in detail.

It should be further noted that, the processor 811 is further configured to implement other processes in the embodiments of the information transmission method applied to a user side device in the foregoing embodiments, which are not described herein in detail.

For example, the embodiments of the present application further provide a user side device, including a processor 811, a memory 890, and a computer program stored in the memory 890 and executable on the processor 811, where the computer program, when being executed by the processor 811, implements each process of the information transmission method applied to a user side device, and can achieve the same technical effects. To avoid repetition, details are not described herein again.

The embodiments of the present application further provide a non-transitory computer-readable storage medium, storing a computer program, where the computer program, when being executed by a processor, implements each process of the embodiments of the foregoing information transmission method applied to a user side device, and can achieve the same technical effect. To avoid repetition, details are not described herein again. The non-transitory computer-readable storage medium is, for example, a read-only memory (ROM), a random access memory (RAM), a magnetic disk, or an optical disc.

The embodiments of the present application further provide a network side device, including a memory, a processor, and a computer program stored in the memory and executable on the processor, where the computer program, when being executed by the processor, implements each process of the embodiments of the foregoing information transmission method applied to a network side device, and can achieve the same technical effects. To avoid repetition, details are not described herein again.

Figure 9:
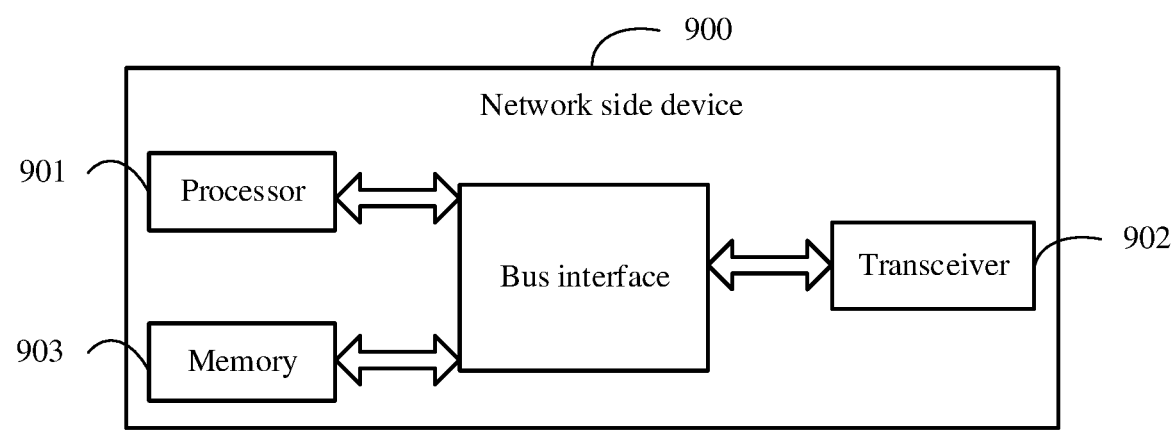
FIG. 9 is a structural block diagram of a network side device according to an embodiment of the present application.

FIG. 9 is a structural diagram of a network side device according to an embodiment of the present application, which can implement details of the foregoing information transmission method, and can achieve the same effect. As shown in FIG. 9, the network side device 900 includes a processor 901, a transceiver 902, a memory 903, and a bus interface.

The transceiver 902 is configured to send first downlink control information DCI, the first DCI carrying count information, where the count information includes at least one of the following: count information of joint scheduling DCI, count information of single scheduling DCI, or joint count information of joint scheduling DCI and single scheduling DCI; and the first DCI is DCI for scheduling uplink data.

In FIG. 9, a bus architecture may include any quantity of interconnected buses and bridges, and specifically connects together circuits that are of one or more processors represented by the processor 901 and of a memory represented by the memory 903. The bus architecture may further connect various other circuits such as a peripheral device, a voltage stabilizer, and a power management circuit. These are known in the field, and therefore are not further described in this specification. The bus interface provides an interface. The transceiver 902 may be a plurality of components. That is, the transceiver 902 includes a transmitter and a receiver, and provides a unit configured to communicate with various other apparatuses on a transmission medium.

Optionally, the count information of joint scheduling DCI is count information of joint scheduling DCI carried in first target DCI; and the first target DCI is latest DCI carrying the count information of joint scheduling DCI before the first DCI.

Optionally, in a case that a first condition is met, the first DCI carries the count information of joint scheduling DCI.

Optionally, the first condition includes at least one of the following:
that the first DCI is DCI for joint uplink scheduling;
that the first DCI is in a first format;
that second DCI is configured by a network side device to carry count information of joint scheduling DCI;
that single scheduling DCI is not configured by a network side device; or
that a time domain position of the first DCI is a position in a third set.

Optionally, in a case that latest DCI before the first DCI is joint scheduling DCI, the first DCI carries at least the count information of joint scheduling DCI.

Optionally, the count information of single scheduling DCI is count information of single scheduling DCI carried in second target DCI; and the second target DCI is latest DCI carrying the count information of single scheduling DCI before the first DCI.

Optionally, in a case that a second condition is met, the first DCI carries the count information of single scheduling DCI.

Optionally, the second condition includes at least one of the following:
that the first DCI is DCI for single uplink scheduling;
that the first DCI is in a second format;
that third DCI is configured by a network side device to carry count information of single scheduling DCI;
that joint scheduling DCI is not configured by a network side device; or
that a time domain position of the first DCI is a position in a fourth set.

Optionally, in a case that latest DCI before the first DCI is single scheduling DCI, the first DCI carries at least the count information of single scheduling DCI.

Optionally, the joint count information of joint scheduling DCI and single scheduling DCI is joint count information carried in third target DCI; and the third target DCI is latest DCI carrying the joint count information before the first DCI.

Optionally, in a case that a time domain position of the first DCI is a position in a first set, the first DCI carries the joint count information of joint scheduling DCI and single scheduling DCI.

Optionally, in a case that a time domain position of the first DCI is a position in a second set, the first DCI carries the count information of joint scheduling DCI and the count information of single scheduling DCI.

Optionally, in a case that the count information of joint scheduling DCI is a first value, feedback information corresponding to the joint scheduling DCI is not allowable to be transmitted in a physical uplink shared channel PUSCH; and/or
    in a case that the count information of joint scheduling DCI is a second value, the feedback information corresponding to the joint scheduling DCI is allowable to be transmitted in the PUSCH.

Optionally, in a case that the count information of single scheduling DCI is a third value, feedback information corresponding to the single scheduling DCI is not allowable to be transmitted in a PUSCH; and/or
    in a case that the count information of single scheduling DCI is a fourth value, the feedback information corresponding to the single scheduling DCI is allowable to be transmitted in the PUSCH.

Optionally, in a case that the joint count information of joint scheduling DCI and single scheduling DCI is a fifth value, feedback information corresponding to the joint count information is not allowable to be transmitted in a PUSCH; and/or in a case that the joint count information of joint scheduling DCI and single scheduling DCI is a sixth value, the feedback information corresponding to the joint count information is allowable to be transmitted in the PUSCH.

Optionally, in a case that the count information includes at least the count information of joint scheduling DCI and code block group CBG is configured to be used for transmission by a network side device, the count information of joint scheduling DCI includes N sub-count information fields, and each sub-count information field corresponds to a sub-codebook; and
    the N is a positive integer.

Optionally, the count information of joint scheduling DCI is count information of DCI for joint downlink scheduling.

Optionally, the count information of single scheduling DCI is count information of DCI for single downlink scheduling.

Optionally, the count information includes at least one of a total number or a counting number.

The network side device may be a base transceiver station (BTS) in a global system for mobile communication (GSM) or code division multiple access (CDMA), or may be a NodeB (NB) in a wideband code division multiple access (WCDMA), or may be an evolutional Node B (eNB or e-NodeB) in LTE, a relay station or an access point, a base station in a future 5G network, or the like, which is not limited herein.

The embodiments of the present application further provide a non-transitory computer-readable storage medium, storing a computer program, where the computer program, when being executed by a processor, implements each process of the embodiments of the foregoing information transmission method applied to a network side device, and can achieve the same technical effect. To avoid repetition, details are not described herein again. The non-transitory computer-readable storage medium is, for example, a read-only memory (ROM), a random access memory (RAM), a magnetic disk, or an optical disc.

It may be understood that the embodiments described in the present disclosure may be implemented by hardware, software, firmware, middleware, microcode, or a combination thereof. For hardware implementation, a module, a unit, a sub-module, a sub-unit, or the like may be implemented in one or more application specific integrated circuits (ASIC), a digital signal processor (DSP), a digital signal processing device (DSPD), a programmable logic device (PLD), a field-programmable gate array (FPGA), a general purpose processor, a controller, a micro-controller, a microprocessor, and other electronic units configured to execute the functions described in this application, or a combination of the above.

It is to be noted that, in the specification, terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by the sentence "including a/an . . . " does not exclude that there are still other same elements in the process, method, object, or apparatus.

Through the descriptions of the foregoing implementations, a person skilled in the art may clearly understand that the method according to the foregoing embodiments may be implemented by software and a necessary general hardware platform, and certainly, may alternatively be implemented by hardware, but the former manner is a preferred implementation in many cases. Based on such an understanding, the technical solutions of the present application essentially, or the part contributing to the prior art, may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network side device, or the like) to perform the methods described in the embodiments of the present application.

The foregoing descriptions are preferable implementations of the present application. A person of ordinary skill in the art may make several improvements and refinements without departing from the principle described in the present application. All such improvements and refinements also fall within the protection scope of the present application.

What is claimed is:

1. An information transmission method, applied to a user side device, and comprising:
    obtaining first downlink control information (DCI) for joint uplink scheduling, wherein the first DCI carries count information of joint scheduling DCI, the first DCI for joint uplink scheduling is used for scheduling a plurality of uplinks, and the joint scheduling DCI is DCI for scheduling a plurality of uplinks or downlinks.

2. The information transmission method according to claim 1, wherein the count information of joint scheduling DCI is count information of DCI for joint downlink scheduling or count information of joint scheduling DCI carried in first target DCI; and wherein the DCI for joint downlink scheduling is used for scheduling a plurality of downlinks, and the first target DCI is latest DCI carrying the count information of joint scheduling DCI before the first DCI.

3. The information transmission method according to claim 1, wherein in a case that latest DCI before the first DCI is joint scheduling DCI, the first DCI carries at least the count information of joint scheduling DCI.

4. The information transmission method according to claim 1, wherein in a case that a time domain position of the first DCI is a position in a first set, the first DCI carries the joint count information of joint scheduling DCI and single scheduling DCI; or in a case that a time domain position of the first DCI is a position in a second set, the first DCI carries the count information of joint scheduling DCI and the count information of single scheduling DCI.

5. The information transmission method according to claim 1, wherein in a case that the count information of joint scheduling DCI is a first value, feedback information corresponding to the joint scheduling DCI is not allowable to be transmitted in a physical uplink shared channel (PUSCH); and/or in a case that the count information of joint scheduling DCI is a second value, the feedback information corresponding to the joint scheduling DCI is allowable to be transmitted in the PUSCH.

6. The information transmission method according to claim 1, wherein in a case that the count information comprises at least the count information of joint scheduling DCI and code block group (CBG) is configured to be used for transmission by a network side device, the count information of joint scheduling DCI comprises N sub-count information fields, and each sub-count information field corresponds to a sub-codebook; and N is a positive integer.

7. An information transmission method, applied to a network side device, and comprising:

sending first downlink control information (DCI) for joint uplink scheduling, wherein the first DCI carries count information of joint scheduling DCI, the first DCI for joint uplink scheduling is used for scheduling a plurality of uplinks, and the joint scheduling DCI is DCI for scheduling a plurality of uplinks or downlinks.

8. The information transmission method according to claim 7, wherein the count information of joint scheduling DCI is count information of DCI for joint downlink scheduling or count information of joint scheduling DCI carried in first target DCI; and wherein the DCI for joint downlink scheduling is used for scheduling a plurality of downlinks, and the first target DCI is latest DCI carrying the count information of joint scheduling DCI before the first DCI.

9. The information transmission method according to claim 7, wherein in a case that a time domain position of the first DCI is a position in a first set, the first DCI carries the joint count information of joint scheduling DCI and single scheduling DCI; or in a case that a time domain position of the first DCI is a position in a second set, the first DCI carries the count information of joint scheduling DCI and the count information of single scheduling DCI.

10. The information transmission method according to claim 7, wherein in a case that the count information of joint scheduling DCI is a first value, feedback information corresponding to the joint scheduling DCI is not allowable to be transmitted in a physical uplink shared channel (PUSCH); and/or in a case that the count information of joint scheduling DCI is a second value, the feedback information corresponding to the joint scheduling DCI is allowable to be transmitted in the PUSCH.

11. A network side device, comprising: a memory, a processor, and a computer program stored in the memory and executable on the processor, wherein the computer program, when executed by the processor, causes the network side device to perform steps of the information transmission method according to claim 7.

12. The information transmission method according to claim 7, wherein in a case that latest DCI before the first DCI is joint scheduling DCI, the first DCI carries at least the count information of joint scheduling DCI.

13. The information transmission method according to claim 7, wherein in a case that the count information comprises at least the count information of joint scheduling DCI and code block group (CBG) is configured to be used for transmission by a network side device, the count information of joint scheduling DCI comprises N sub-count information fields, and each sub-count information field corresponds to a sub-codebook; and N is a positive integer.

14. A user side device, comprising: a memory, a processor, and a computer program stored in the memory and executable on the processor, wherein the computer program, when executed by the processor, causes the user side device to perform:

obtaining first downlink control information (DCI) for joint uplink scheduling, wherein the first DCI carries count information of joint scheduling DCI, the first DCI for joint uplink scheduling is used for scheduling a plurality of uplinks, and the joint scheduling DCI is DCI for scheduling a plurality of uplinks or downlinks.

15. The user side device according to claim 14, wherein the count information of joint scheduling DCI is count information of DCI for joint downlink scheduling or count information of joint scheduling DCI carried in first target DCI; and wherein the DCI for joint downlink scheduling is used for scheduling a plurality of downlinks, and the first target DCI is latest DCI carrying the count information of joint scheduling DCI before the first DCI.

16. The user side device according to claim 14, wherein in a case that latest DCI before the first DCI is joint scheduling DCI, the first DCI carries at least the count information of joint scheduling DCI.

17. The user side device according to claim 14, wherein in a case that the count information of joint scheduling DCI is a first value, feedback information corresponding to the joint scheduling DCI is not allowable to be transmitted in a physical uplink shared channel (PUSCH); and/or in a case that the count information of joint scheduling DCI is a second value, the feedback information corresponding to the joint scheduling DCI is allowable to be transmitted in the PUSCH.

18. The user side device according to claim 14, wherein in a case that a time domain position of the first DCI is a position in a first set, the first DCI carries the joint count information of joint scheduling DCI and single scheduling DCI; or in a case that a time domain position of the first DCI is a position in a second set, the first DCI carries the count information of joint scheduling DCI and the count information of single scheduling DCI.

19. The user side device according to claim 14, wherein in a case that the count information comprises at least the count information of joint scheduling DCI and code block group (CBG) is configured to be used for transmission by a network side device, the count information of joint scheduling DCI comprises N sub-count information fields, and each sub-count information field corresponds to a sub-codebook; and N is a positive integer.

* * * * *